United States Patent
King et al.

(10) Patent No.: US 11,108,249 B2
(45) Date of Patent: Aug. 31, 2021

(54) COMMUNICATION TO CONTROL CHARGING OF A RECHARGEABLE BATTERY

(71) Applicant: Textron Innovations Inc., Providence, RI (US)

(72) Inventors: Russell William King, Evans, GA (US); Amy Jean Landau, Irmo, SC (US); Matthew James Zaremba, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 393 days.

(21) Appl. No.: 16/105,510

(22) Filed: Aug. 20, 2018

(65) Prior Publication Data

US 2019/0067961 A1 Feb. 28, 2019

Related U.S. Application Data

(60) Provisional application No. 62/552,718, filed on Aug. 31, 2017.

(51) Int. Cl.
*H02J 7/00* (2006.01)
*B60L 53/14* (2019.01)
(Continued)

(52) U.S. Cl.
CPC ............ *H02J 7/0021* (2013.01); *B60L 53/14* (2019.02); *H02J 7/0045* (2013.01);
(Continued)

(58) Field of Classification Search
USPC ......................................................... 320/109
See application file for complete search history.

(56) References Cited

U.S. PATENT DOCUMENTS

| 5,504,413 A | * | 4/1996 | Fernandez ............ H02J 7/0068 320/163 |
|---|---|---|---|
| 6,616,573 B2 | | 9/2003 | McLeod et al. |

(Continued)

OTHER PUBLICATIONS

Garia, "Introducing the New Garia Golf", http://www.garia.com/news/introducing-the-new-garia-golf/, Sep. 15, 2016.

*Primary Examiner* — Samuel Berhanu
(74) *Attorney, Agent, or Firm* — BainwoodHuang

(57) ABSTRACT

A system controls charging of a rechargeable battery. The system includes a rechargeable battery configured to provide rechargeable battery power to a set of electrical loads (e.g., an electric motor of a utility vehicle). The system further includes a connector configured to connect to a charger, and control circuitry coupled with the rechargeable battery and the connector. The control circuitry is operative to (i) sense a charge management event, (ii) in response to the charge management event, connect the rechargeable battery to the connector and disconnect the rechargeable battery from the connector to provide a message to the charger through the connector (e.g., via opening and closing a contactor), and (iii) after communicating the message to the charger, manage connection between the rechargeable battery and the charger to control charging of the rechargeable battery through the connector (e.g., via opening and closing the contactor).

21 Claims, 19 Drawing Sheets

(51) Int. Cl.
*H02J 7/14* (2006.01)
*H01M 10/42* (2006.01)

(52) U.S. Cl.
CPC ....... *H02J 7/1446* (2013.01); *H01M 10/4257* (2013.01); *H02J 7/1492* (2013.01)

(56) References Cited

U.S. PATENT DOCUMENTS

| | | |
|---|---|---|
| 7,778,746 B2 | 8/2010 | McLeod et al. |
| 9,026,303 B1 | 5/2015 | Ferguson et al. |
| 9,199,546 B2 | 12/2015 | King |
| 9,225,183 B2 | 12/2015 | King |
| 9,908,461 B2 | 3/2018 | Gasper |
| 10,110,053 B2 | 10/2018 | Brackx et al. |
| 2006/0181241 A1* | 8/2006 | Veselic ................. H02J 7/0034 320/107 |
| 2011/0279078 A1* | 11/2011 | Hara ....................... H02J 7/085 320/107 |
| 2014/0145679 A1* | 5/2014 | Chen .................. H02M 3/1582 320/128 |
| 2016/0190824 A1* | 6/2016 | Brackx .................. H02J 7/027 320/162 |
| 2019/0319472 A1 | 10/2019 | Lebreux |

\* cited by examiner

COMMUNICATION TO CONTROL CHARGING OF A RECHARGEABLE BATTERY

BACKGROUND

A conventional battery powered vehicle includes rechargeable batteries which discharge while energizing loads such as an electric motor of the vehicle. The batteries are then recharged from the electric grid.

To recharge the batteries of the vehicle, a human operator typically parks the vehicle next to a charging station, attaches a plug from the charging station to an electrical socket of the vehicle, and actuates a charge-enable switch that electrically connects the batteries to the electrical socket so that the batteries receive charge from the charging station through the electrical socket.

SUMMARY

It should be understood that there are deficiencies to the above-described conventional approach to charging a battery powered vehicle. For example, the conventional approach is manually intensive in that the user must remember to manually actuate the charge-enable switch. Otherwise, charge from the charging station will not reach the battery.

Additionally, under some conditions, it may be better to charge a battery at less than a full charge rate (e.g., it may be better to charge a lithium battery at a slower or partial rate if the temperate is higher or lower than optimal charging temperature). Unfortunately, there is currently no convenient way for the charging station to know the current temperature of the battery and any temperature-based charge rate control process involving the human operator would require training and/or remain subject to risk (e.g., prone to error, imprecision/inconsistencies in manually reading temperature, etc.).

Moreover, other situations may exist in which the charging station should operate differently and there is currently no way for the charging station to auto-detect such a situation. Along these lines, the human operator may wish to place the battery in a storage mode (e.g., where the battery should be placed in a partially charged state because the battery will remain unused for an extended amount of time but where the human operator is unsure whether the battery requires charging or discharging). Unfortunately, there is no convenient way for the utility vehicle to convey such information to the charging station. Likewise, the charging station may be suitable for charging either a lithium battery or a lead acid battery, but there is still no convenient way for the utility vehicle to convey this information to the charging station.

In contrast, improved techniques are directed to charging a disconnectable rechargeable battery based on communication that occurs between rechargeable battery control circuitry and a charger over a set of charge delivery pathways. In particular, the rechargeable battery control circuitry opens and closes a contactor that controls the set of charge delivery pathways to send a message to the charger indicating a particular charge mode for the charger. The charger may respond over the set of charge delivery pathways confirming receipt of the particular charge mode and then appropriately provide charge to the rechargeable battery through the set of charge delivery pathways. At any time, the rechargeable battery control circuitry may operate the contactor to further communicate with the charger and/or disconnect the rechargeable battery from the charger. Such techniques thus provide a mechanism for the rechargeable battery control circuitry to inform the charger of various items of information (e.g., whether the battery is lithium or lead acid, a particular charging mode, a change in charging mode, and so on).

One embodiment is directed to a system for controlling charging of a rechargeable battery. The system includes a rechargeable battery configured to provide rechargeable battery power to a set of electrical loads (e.g., an electric motor of a utility vehicle). The system further includes a connector configured to connect to a charger, and control circuitry coupled with the rechargeable battery and the connector. The control circuitry is operative to:

(A) sense a charge management event,
(B) in response to the charge management event, connect the rechargeable battery to the connector and disconnect the rechargeable battery from the connector to provide an initial message to the charger through the connector, and
(C) after communicating the initial message to the charger, manage connection between the rechargeable battery and the charger to control charging of the rechargeable battery through the connector.

In some arrangements, the control circuitry includes a contactor coupled with the rechargeable battery and the connector, and control logic coupled with the contactor. In these arrangements, when the control circuitry connects the rechargeable battery to the connector and disconnects the rechargeable battery from the connector to provide an initial message to the charger in response to the charge management event, the control logic is operative to control opening and closing of the contactor. Furthermore, when the control circuitry manages connection between the rechargeable battery and the charger to control charging of the rechargeable battery, the control logic is operative to continue to control opening and closing of the contactor to send further messages to the charger through the connector.

In some arrangements, the control logic, when controlling opening and closing of the contactor, is operative to:

(i) perform a set of rechargeable battery evaluation operations to assess a current condition of the rechargeable battery,
(ii) based on a result of the set of rechargeable battery evaluation operations, select a particular charge mode from multiple selectable charge modes, and
(iii) actuate the contactor in a predefined manner to identify the particular charge mode to the charger.

In some arrangements, the multiple selectable charge modes include:

(i) a normal charge rate mode identified by a first contactor open/close pattern, the normal charge rate mode involving charging of the rechargeable battery at a normal charge rate,
(ii) a partial charge rate mode identified by a second contactor open/close pattern, the partial charge rate mode involving charging of the rechargeable battery at a partial charge rate which is less than the normal charge rate,
(iii) a discharge mode identified by a third contactor open/close pattern, the discharge mode involving discharging of the rechargeable battery, and
(iv) a no-adjustment mode identified by a fourth contactor open/close pattern, the no-adjustment mode involving no charging or discharging of the rechargeable battery.

In these arrangements, the first, second, third, and fourth contactor open/close patterns are different from each other.

In some arrangements, the control logic, when selecting the particular charge mode from multiple selectable charge modes, is operative to select one of the first, second, third, and fourth contactor open/close patterns based on the result of the set of rechargeable battery evaluation operations. In certain arrangements, each of the first, second, third, and fourth contactor open/close patterns includes a different time interval in which the control logic maintains closure of the contactor. In other arrangements, each of the first, second, third, and fourth contactor open/close patterns includes a different number of times in which the control logic opens and closes the contactor.

In some arrangements, each of the first, second, third, and fourth contactor open/close patterns includes the control logic holding the contactor closed for at least one second and for less than 30 seconds before opening the contactor. Other time ranges are suitable for use as well.

In some arrangements, when the contactor is closed, the contactor connects (i) a first conductive pathway between the rechargeable battery and the charger and (ii) a second conductive pathway between the rechargeable battery and the charger. Here, the first and second conductive pathways form a set of charge delivery pathways to deliver charge from the charger to the rechargeable battery through the connector. Additionally, when the contactor is open, the contactor disconnects at least one of the first and second conductive pathways to prevent charge delivery from the charger to the rechargeable battery through the connector.

In some arrangements, the control logic is further operative to, after the control logic provides the initial message and before the control logic manages connection between the rechargeable battery and the charger, sense the set of charge delivery pathways for a charger notification from the charger and through the connector in response to the initial message. In certain arrangements, the control logic, when sensing the set of charge delivery pathways for the charger notification, is operative to listen for a predefined signal from the charger indicating whether the charger has correctly received the initial message. For example, the charger may echo back (or repeat) the message back to the control logic as confirmation that the message was properly received by the charger.

In some arrangements, the control logic, when listening for the predefined signal from the charger, is operative to obtain, on the set of charge delivery pathways, a charger response from the charger, and compare the charger response to an expected response to determine whether the charger is ready to properly charge the rechargeable battery.

In some arrangements, the charger is operative to provide a charging voltage on the set of charge delivery pathways. Here, while the charger provides the charging voltage on the set of charge delivery pathways, the control logic is operative to listen for a predefined signal from the charger indicating whether the charger has correctly received the initial message, the predefined signal being different from the charging voltage.

In some arrangements, the charger is operative to provide a charging voltage on the set of charge delivery pathways. In these arrangements, while the charger provides the charging voltage on the set of charge delivery pathways, the control logic is operative to open and close the contactor to communicate the initial message to the charger.

In some arrangements, the control logic is further operative to sense a second event and, in response to the second event, connect the rechargeable battery to the connector and disconnect the rechargeable battery from the connector to provide a follow-up message to the charger on the set of charge delivery pathways.

In some arrangements, the control logic is further operative to, after providing the follow-up message to the charger on the set of charge delivery pathways, sense for a follow-up notification on the set of charge delivery pathways from the charger and through the connector in response to the follow-up message.

In some arrangements, the control circuitry, when sensing the charge management event, is operative to detect, as the charge management event, connection of the charger to the connector. In these arrangements, the control logic, when sensing the second event, is operative to detect, as the second event, expiration of a timer that measures a predefined amount of rechargeable battery charging time.

Another embodiment is directed to a utility vehicle which includes a utility vehicle body, a set of electrical loads supported by the utility vehicle body, and a charge control system supported by the utility vehicle body and coupled with the set of electrical loads. The charge control system includes a rechargeable battery configured to provide rechargeable battery power to the set of electrical loads of a utility vehicle, a connector supported by the utility vehicle body, the connector being configured to connect to a charger, and control circuitry coupled with the rechargeable battery and the connector. The control circuitry is operative to:
  (A) sense a charge management event,
  (B) in response to the charge management event, connect the rechargeable battery to the connector and disconnect the rechargeable battery from the connector to provide an initial message to the charger, and
  (C) after communicating the initial message to the charger, manage connection between the rechargeable battery and the charger to control charging of the rechargeable battery.

Another embodiment is directed to a method which is performed in a utility vehicle. The method includes:
  (A) sensing a charge management event,
  (B) in response to the charge management event, connecting the rechargeable battery to a connector of the utility vehicle and disconnecting the rechargeable battery from the connector of the utility vehicle to provide an initial message to the charger through the connector, and
  (C) after communicating the initial message to the charger, managing connection between the rechargeable battery and the charger to control charging of the rechargeable battery through the connector.

Another embodiment is directed to a charger that charges a rechargeable battery of a utility vehicle. The charger includes a vehicle connector operative to connect to a connector of the utility vehicle, a set of power signal conductors coupled to the vehicle connector, and a control circuit coupled with the set of power signal conductors. The control circuit is operative to:
  (A) provide an initial signal through the set of power signal conductors and the vehicle connector when the vehicle connector is connected to the connector of the utility vehicle to wake up control circuitry of the utility vehicle;
  (B) after the initial signal is provided through the set of power signal conductors and the vehicle connector, detect an initial message on the set of power signal conductors, the initial message being provided by the control circuitry of the utility vehicle in response to the initial signal; and (C) based on the initial message, provide charge to the rechargeable battery of the utility vehicle through the set of power signal conductors and the vehicle connector.

In some arrangements, the control circuit, when detecting the initial message on the set of power signal conductors, is operative to sense a pattern of current through the set of power signal conductors. The pattern of current results from circuitry of the utility vehicle connecting the rechargeable battery to the connector of the utility vehicle and disconnecting the rechargeable battery from the connector of the utility vehicle.

In some arrangements, the control circuit is further operative to, in response to the initial message, switch from a lead acid battery charging mode to a lithium battery charging mode. If the control circuitry does not receive the initial message after a predefined amount of time has elapsed (e.g., five minutes, 10 minutes, etc.), the control circuit operates in the lead acid battery charging mode to provide charge to a lead acid battery rather than a lithium battery.

Other embodiments are directed to higher and lower level systems, assemblies, apparatus, processing circuits, etc. Some embodiments are directed to various processes, electronic components and circuitry which are involved in charging a rechargeable battery based on communication that occurs between rechargeable battery control circuitry and a charger over a set of charge delivery pathways.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to charging a disconnectable rechargeable battery based on communication that occurs between rechargeable battery control circuitry and a charger over a set of charge delivery pathways. In particular, the rechargeable battery control circuitry opens and closes a contactor that controls the set of charge delivery pathways to send a message to the charger indicating a particular charge mode for the charger. The charger may respond over the set of charge delivery pathways confirming receipt of the particular charge mode and then appropriately provide charge to the rechargeable battery through the set of charge delivery pathways. At any time, the rechargeable battery control circuitry may operate the contactor to further communicate with the charger and/or disconnect the rechargeable battery from the charger. Such a technique may thus provide a mechanism for the rechargeable battery control circuitry to inform the charger of various items of information (e.g., whether the battery is lithium or lead acid, a particular charging mode, a change in charging mode, and so on).

It should be understood that various battery technologies are suitable for use for the disconnectable rechargeable battery such as lithium and lead acid. Other suitable technologies include nickel cadmium, nickel metal hydride, other electrochemical cells/batteries, and so on.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
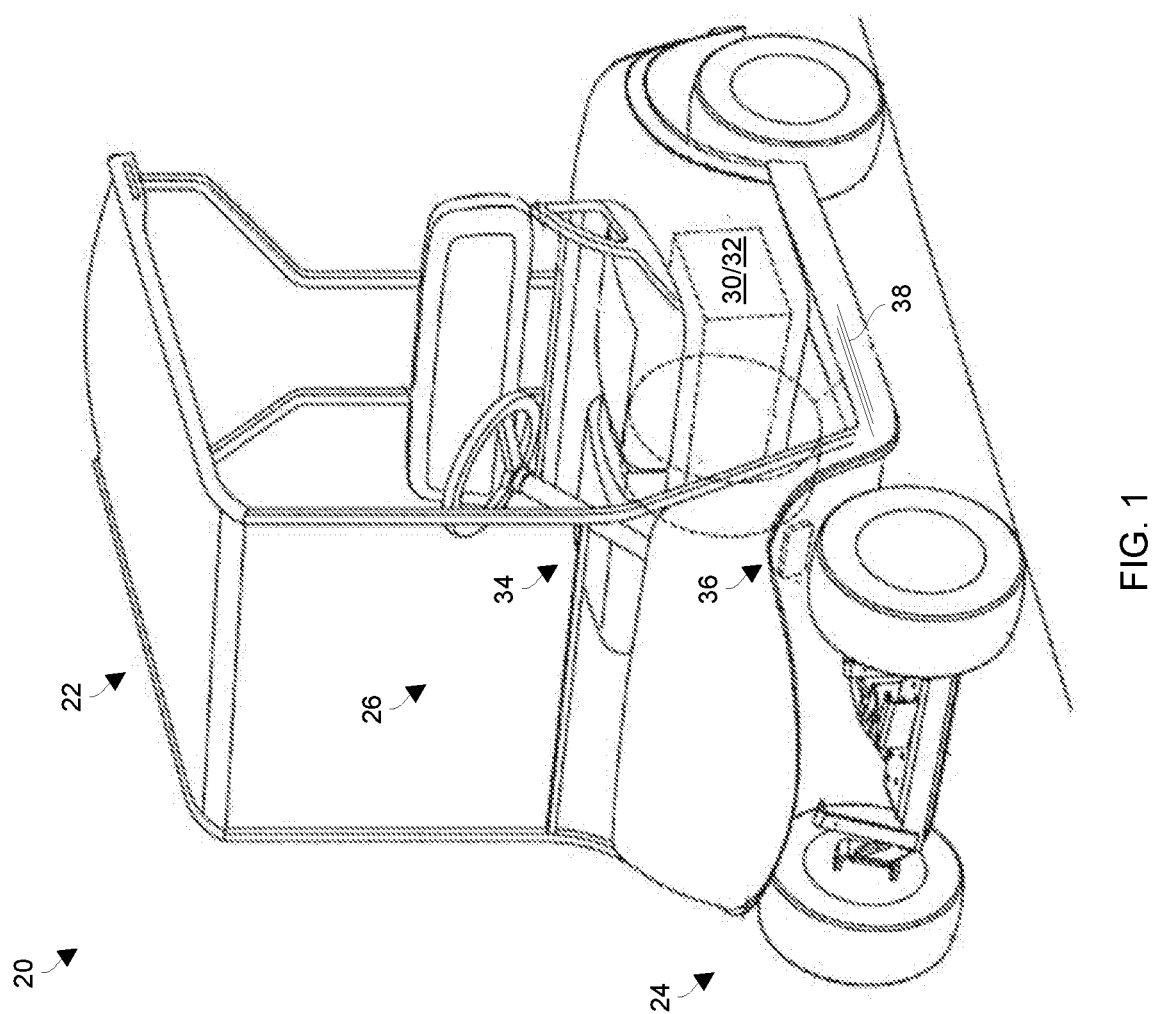
FIG. 1 is a perspective view of an example utility vehicle which controls electrical access to a rechargeable battery.

FIG. 1 shows an example utility vehicle 20 which controls electrical access to a rechargeable battery. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles. In embodiments, such as the example of FIG. 1, in which the utility vehicle 20 is a golf car, the golf car may include an operator seating area covered by a canopy supported by a plurality of struts. The golf car may further comprise a rear bag well area disposed rearward of the operator seating area and configured to carry one or more golf bags and/or other cargo. In some embodiments, the rear bag well area may support a rear facing seat for carrying additional passengers and/or a convertible rear seat kit configured to convert to a cargo deck for carrying cargo, such as E-Z-GO Rear Flip Seat Kit Item #750265PKG.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a rechargeable battery system 32, and additional components 34 such as a set of user controls 36 (e.g., a foot pedal, a keyed switch, a maintenance switch, etc.) and cabling 38. As will be explained in further detail below, the utility vehicle 20 runs on power from a rechargeable battery and is equipped with a sleep/wakeup feature that automatically disconnects the rechargeable battery in response to certain timeout conditions thus preventing the rechargeable battery from further discharging. Further details will now be provided with reference to FIGS. 2 and 3.

Figure 2:
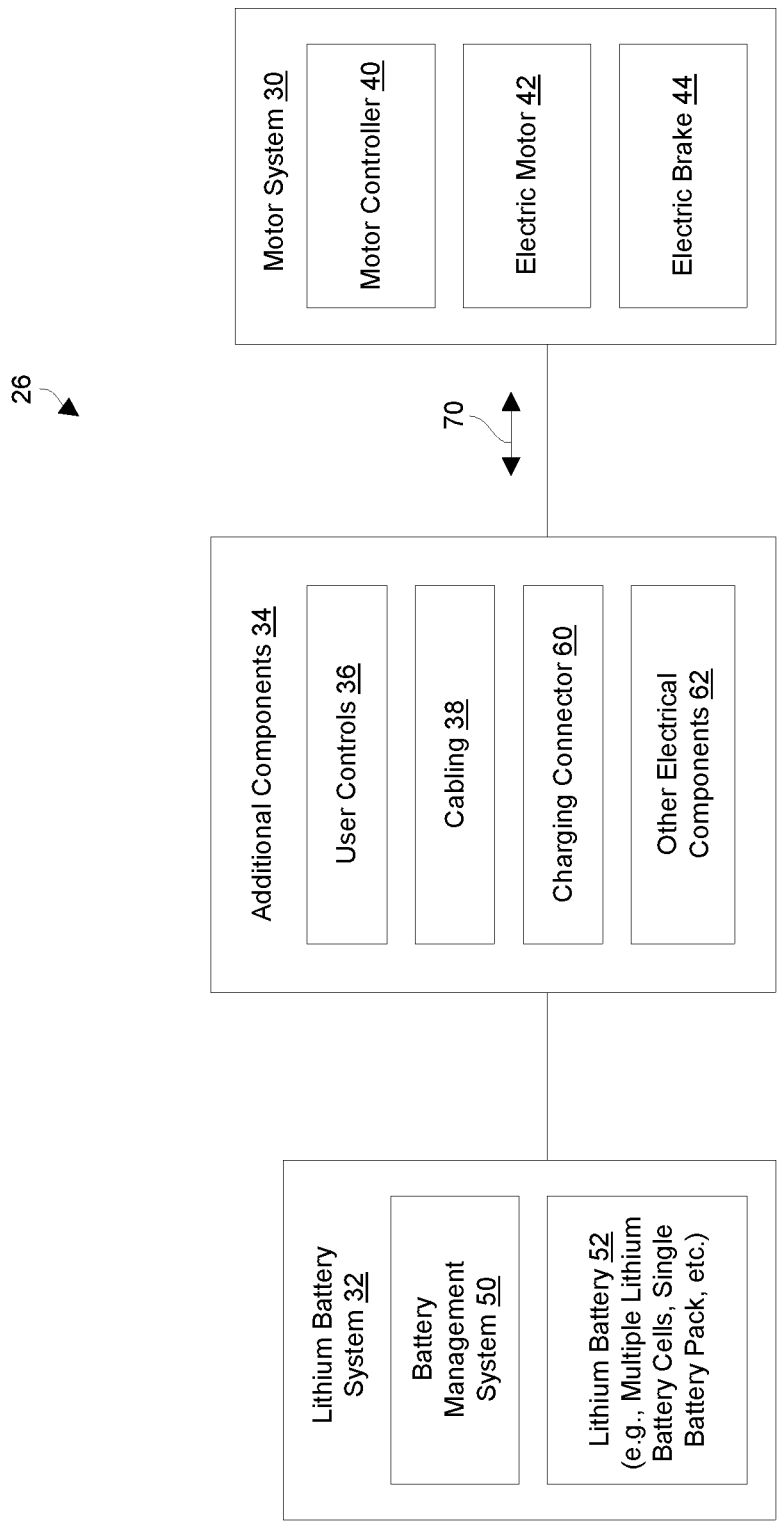
FIG. 2 is a block diagram of particular systems and components of the utility vehicle of FIG. 1 in accordance with some example embodiments.
Figure 3:
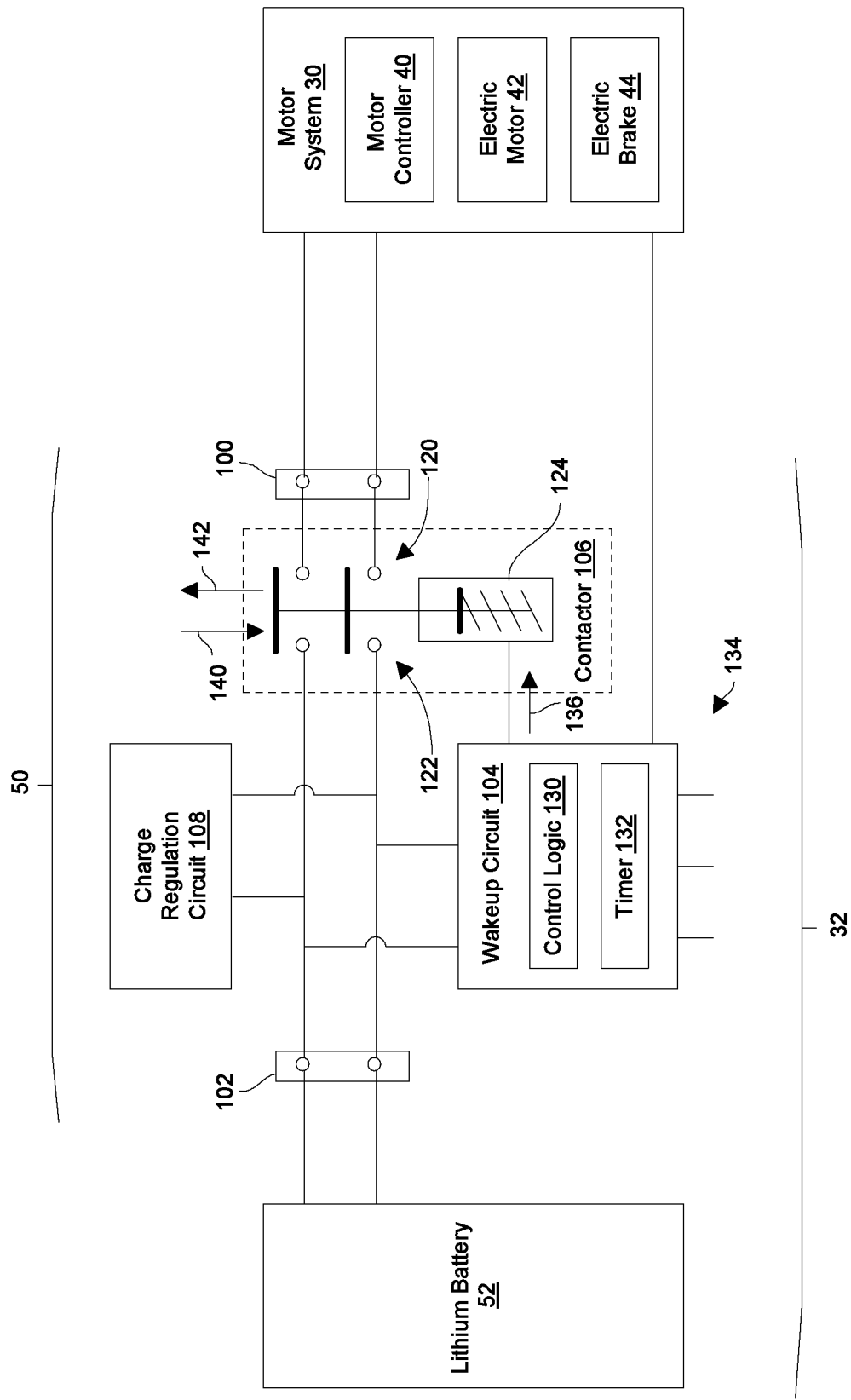
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) of some example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller 40, an electric motor 42 which is linked to the set of tires 24 (FIG. 1), and an electric brake 44 coupled with the electric motor 42. The motor controller 40 of some embodiments controls delivery of stored electric power from the rechargeable battery system 32 to the electric motor 42 which ultimately turns at least some of the tires 24 to move the utility vehicle 20. Additionally, the motor controller 40 of some embodiments controls delivery of regenerative power from the electric motor 42 to recharge the rechargeable battery system 32 (e.g., during braking, while the utility vehicle 20 coasts downhill without any pedal depression, etc.).

The electric brake 44 is constructed and arranged to provide mechanical resistance which inhibits turning of the electric motor 42 when the electric brake 44 is unpowered, and remove the mechanical resistance to release the electric motor 42 thus allowing the electric motor 42 to turn when the electric brake 44 receives power. Accordingly, in some embodiments, when the utility vehicle 20 sits idle (i.e., the utility vehicle 20 is awake but a user is not pressing on the accelerator pedal, the utility vehicle 20 is turned off, etc.), the electric brake 44 remains engaged and the utility vehicle 20 sits in a parked state.

The rechargeable battery system 32 includes a battery management system (BMS) 50 and a rechargeable battery 52. The BMS 50 controls electrical access to the rechargeable battery 52. Additionally, as will be explained in further detail shortly, the BMS 50 of some embodiments responds to various events such as sleep events (e.g., timeouts) to prevent excessive discharging of the rechargeable battery 52 thus safeguarding the rechargeable battery 52 from becoming over discharged. In some embodiments, the BMS 50 responds to other events as well such as wakeup events (e.g., actuation of the user controls 36), charging situations, fault conditions, and so on to properly and safely control charging and discharging of the rechargeable battery 52.

It should be understood that a variety of form factors are suitable for the rechargeable battery 52. For example, the rechargeable battery 52 may include multiple rechargeable battery cells, a single battery pack, combinations thereof, and so on.

The additional components 34 may, for example, include the set of user controls 36 (e.g., pedals, switches, etc.), the cabling 38, a charging connector 60, and perhaps other electrical components 62 (e.g., lights, a global positioning system (GPS), specialized equipment, etc.). In some arrangements, the cabling 38 includes a communications bus, such as, for example, a controller area network (CAN) bus through which the motor system 30 and the rechargeable battery system 32 exchange communications 70 such as electronic CAN messages in accordance with the CAN protocol.

As shown in FIG. 3, in accordance with some example embodiments, the battery management system (BMS) 50 of the rechargeable battery system 32 includes a power delivery interface 100, a rechargeable battery interface 102, a wakeup circuit 104, a contactor 106, and a charge regulation circuit 108. These components may reside together as a single assembly or unit (e.g., within the same enclosure) or in a distributed manner among different locations on the utility vehicle body 22 (also see FIG. 1).

The power delivery interface 100 couples with the motor system 30. Similarly, the rechargeable battery interface 102 couples with the rechargeable battery 52. The wakeup circuit 104 controls closing and opening of the contactor 106 to electrically connect the motor system 30 to the rechargeable battery 52 and disconnect the motor system 30 from the rechargeable battery 52, respectively. During such operation, the charge regulation circuit 108 controls signal conditioning during discharging and charging of the rechargeable battery 52.

As further shown in FIG. 3, the contactor 106 includes a set of target contacts 120 that couple with the power delivery interface 100, a set of source contacts 122 that couple with the rechargeable battery interface 102, and an electromagnetic actuator 124. Although FIG. 3 shows the contactor 106 controlling two signal paths between the motor system 30 and the rechargeable battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.).

The wakeup circuit 104 includes control logic 130 and a timer 132 which operate to manage access to the rechargeable battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the rechargeable battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. In particular, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the rechargeable battery 52. As a result, there are no parasitic loads placed on the rechargeable battery 52 that could otherwise further discharge the rechargeable battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required.

Wakeup/Sleep

Figure 4:
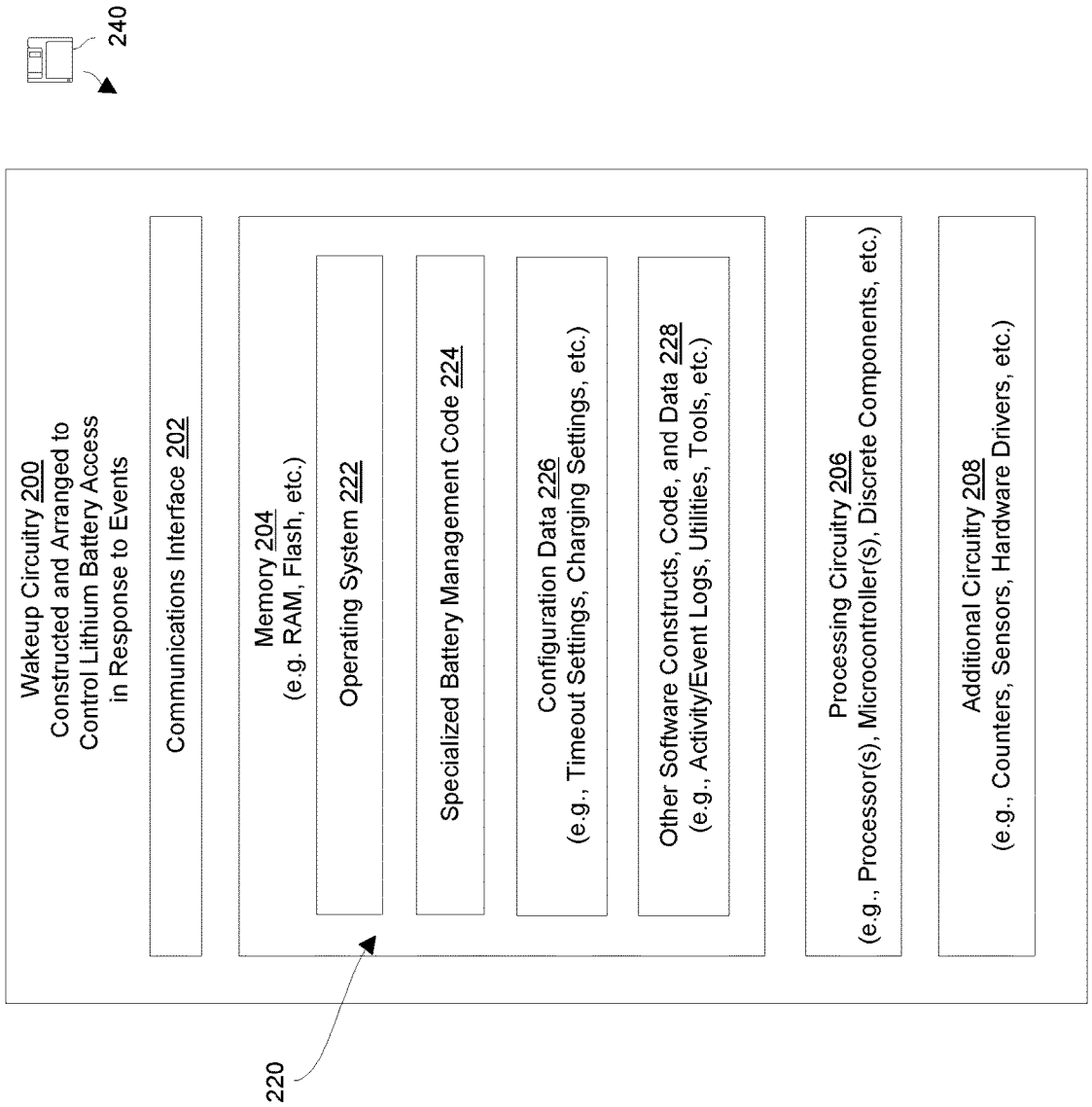
FIG. 4 is a block diagram of particular details of a wakeup circuit of a battery management system of the utility vehicle of FIG. 1 in accordance with some example embodiments.
Figure 5:
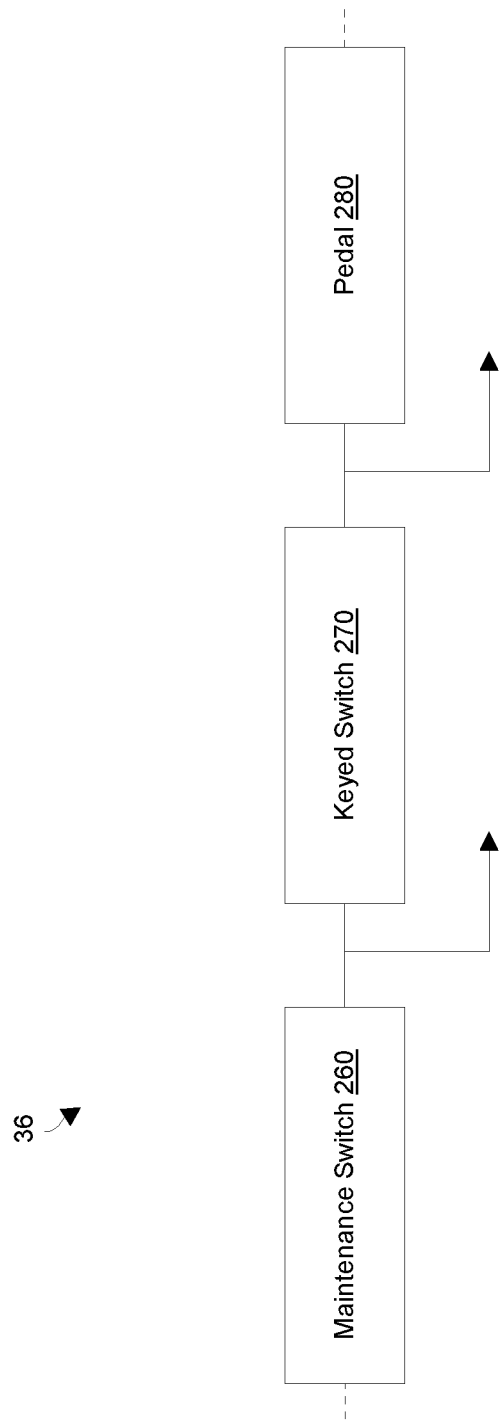
FIG. 5 is a block diagram of a first arrangement of particular user controls that provide input to the wakeup circuit of FIG. 4 in accordance with some example embodiments.
Figure 6:
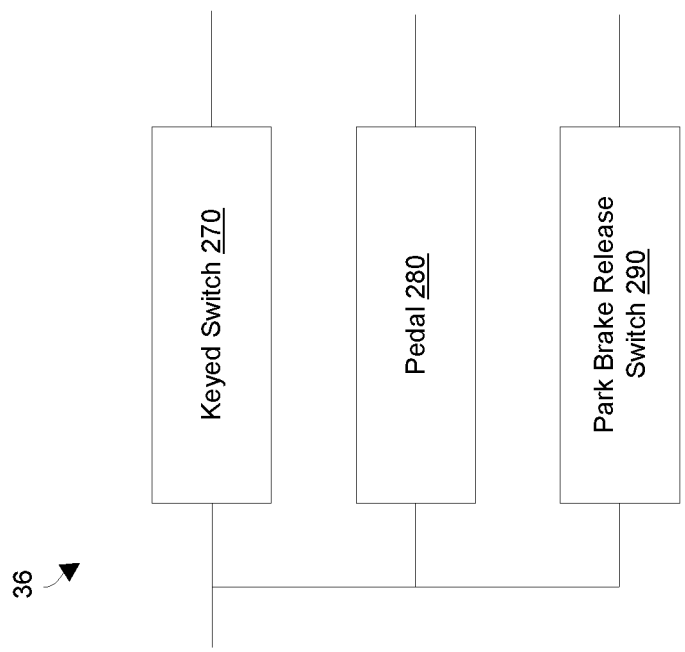
FIG. 6 is a block diagram of a second arrangement of particular user controls that provide input to the wakeup circuit of FIG. 4 in accordance with some example embodiments.

FIGS. 4 through 6 provide particular details of how the battery management system (BMS) 50 responds to wakeup and sleep events in accordance with some embodiments. FIG. 4 shows example details of wakeup circuitry 200 which is suitable for the wakeup circuit 104 (also see FIG. 3) in accordance with some embodiments. FIG. 5 shows a first arrangement of particular user controls 36 that couple with the inputs 134 and control operation of the wakeup circuit 104 (FIG. 3) in accordance with some embodiments. FIG. 6 shows a second arrangement of particular user controls 36 that couple with the inputs 134 and control operation of the wakeup circuit 104 (FIG. 3) in accordance with some embodiments.

As shown in FIG. 4, the wakeup circuitry 200 controls access to the rechargeable battery 52 (FIG. 3) in response to various events, situations, faults, etc. As shown in FIG. 4, the wakeup circuitry 200 includes, in an example embodiment, a communications interface 202, memory 204, processing circuitry 206, and additional circuitry 208. Such components form the control logic 130 and the timer 132 of the wakeup circuit 104 (FIG. 3).

The communications interface 202 is constructed and arranged to connect the wakeup circuitry 200 to one or more communications media such as a controller area network (CAN) bus (also see the cabling 38 in FIG. 1). Such communications may include different media such as copper-based (e.g., USB, RJ45, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined timeout settings, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the rechargeable battery 52 (FIGS. 2 and 3). The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the wakeup circuitry 200 (e.g., also see the memory constructs 220 in FIG. 4). The computer program product 240 has a non-transitory (or non-volatile) computer readable medium which stores a set of instructions which controls one or more operations of the wakeup circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the wakeup circuitry 200. Such circuitry may include hardware counters, signal drivers, connectors, sensors, and so on. In some arrangements, where the utility vehicle is specialized equipment (e.g., a food and beverage vehicle, an ATV, etc.) the additional circuitry 208 may represent other components such as an electronic thermostat, lighting control, and so on.

With reference to FIG. 5 and in accordance with some embodiments, a first arrangement of the user controls 36 includes a maintenance switch 260, a keyed switch 270, and an accelerator (or throttle) pedal 280 which are electrically connected in series to the other circuitry of the motion control system 26 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, and so on. In some arrangements, one or more of the user controls 36 connect directly to the motor system 30 and input signals are sensed by the BMS 50 from the motor system 30.

With reference to FIG. 6 and in accordance with some embodiments, a second arrangement of the user controls 36 includes a keyed switch 270, and an accelerator (or throttle) pedal 280, and a park brake release switch 290 (e.g., a switch which energizes and releases an electric brake to enable towing) which are electrically connected in parallel to the BMS 50 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, a tow switch which is different from the park brake release switch, and so on.

In some embodiments, the park brake release switch 290 is formed by an actual physical switching device that a user can move to different positions. In other embodiments, the park brake release switch 290 is formed by a set of jumpers (e.g., connectors, cables, etc.) that are switchable or arrangeable into different connecting configurations (e.g., a normal configuration, a tow configuration, etc.).

It should be understood the control logic 130 and the timer 132 of the wakeup circuit 104 (FIG. 3), which are formed by the wakeup circuitry 200 (FIG. 4), operate to monitor user activity of the utility vehicle 20 as well as transition the BMS 50 from a sleeping state to an awake state and vice versa. Further details of such operation will now be provided.

During operation, the wakeup circuit 104 monitors operation of the user controls 36 to determine whether to electrically connect the rechargeable battery 52 to the motor system 30 or electrically disconnect the rechargeable battery 52 from the motor system 30. For example, suppose that a human operator (or user) wishes to operate the utility vehicle 20 after an extended period of non-use such as a 24-hour period. In such a situation, the utility vehicle 20 is initially in a sleep (or unawake) mode or state in which the wakeup circuit 104 (FIG. 3) is completely unpowered and the contactor 106 is open (i.e., where there is no circuit formed between the rechargeable battery 52 and the motor system 30). Accordingly, there are no electrical loads on the rechargeable battery 52 that could otherwise drain charge from the rechargeable battery 52.

Further details of wakeup/sleep operation will now be provided with reference to some embodiments in connection with FIG. 5. Suppose that the user turns the maintenance switch 260 to an ON position (e.g., by simply transitioning the maintenance switch 260 from an OFF position to the ON position, by cycling the maintenance switch 260 from the ON position to the OFF position and back to the ON position, etc.). In such a situation, the wakeup circuit 104 of the BMS 50 turns on and responds by outputting the actuation signal 136 to close the contactor 106 (FIG. 3). As a result of such a wakeup event, the contactor 106 connects the source contacts 122 to the target contacts 120 thus connecting the rechargeable battery 52 to the motor system 30 and waking the motor system 30.

At this time and in accordance with some embodiments, both the BMS 50 and the motor system 30 perform various self-tests. For example, the BMS 50 checks the amount of charge remaining in the rechargeable battery 52 and, if the amount of charge is below a predefined minimum charge threshold, the BMS 50 terminates (e.g., immediately terminates) the actuation signal 136 to electrically disconnect the rechargeable battery 52 from the motor system 30. Such operation prevents the rechargeable battery 52 from becoming over-discharged. It should be understood that, while the BMS 50 remains awake, the BMS 50 continues to monitor charge remaining in the rechargeable battery 52 and terminates the actuation signal 136 to disconnect the rechargeable battery 52 from the motor system 30 if the remaining charge reaches (or falls below) the predefined minimum charge threshold to safeguard the battery against becoming over-discharged. In particular, there is still safety margin between the predefined minimum charge threshold and an over-discharged level.

In some embodiments, after passing their respective self-tests, the BMS 50 and the motor system 30 communicate with each other (e.g., exchange communications 70 such as CAN messages) to verify configuration information (e.g., model numbers, versions, status, etc.). In some arrangements, the motor system 30 may be one of multiple models and the wakeup circuit 104 operates using different configuration settings depending on the particular model identified via communications with the motor system 30.

Also, at this time, the control logic 130 of the wakeup circuit 104 starts the timer 132 (FIG. 3) which counts or tracks time until the timer 132 reaches a predefined idle time threshold (i.e., a maximum idle time limit). In accordance with some embodiments, example values that are suitable for use for the predefined idle time threshold include time amounts within the time range of 10 hours to 14 hours (e.g., 11 hours, 12 hours, 13 hours, etc.). In accordance with other embodiments, example values that are suitable for use for the predefined idle time threshold include time amounts within the time range of 2 hours to 6 hours (e.g., 3 hours, 4 hours, 5 hours, etc.). If the timer 132 counts from an initial time value to the predefined idle time threshold (a sleep event), the timer 132 outputs a sleep event signal to the control logic 130 of the wakeup circuit 104 which causes the control logic 130 to terminate output of the actuation signal 136 thus disconnecting the rechargeable battery 52 from the motor system 30. Such operation prevents the rechargeable battery 52 from unnecessarily succumbing to parasitic loads from the motor system 30, from the contactor 106 (i.e., the coil maintaining the contactor 106 in the closed position), and perhaps from elsewhere in the utility vehicle 20.

However, after BMS 50 has woken up, suppose that the user inserts a physical key into the keyed switch 270 and moves the keyed switch 270 from the OFF position to the ON position before the timer 132 reaches the predefined idle time threshold. In response to this sensed user activity, the control logic 130 restarts the timer 132 to the initial time value. Accordingly, the timer 132 is prevented from reaching the predefined idle time threshold and expiring.

Likewise, suppose that the user actuates the accelerator pedal 280 (e.g., moves the pedal 280 from its non-depressed position) before the timer 132 reaches the predefined idle time threshold. In response to this sensed user activity, the control logic 130 restarts the timer 132 to the initial time value. Again, the timer 132 is prevented from reaching the predefined idle time threshold and expiring. It should be understood that moving the accelerator pedal 280 may further signal the motor system 30 to operate the motor 42 (e.g., rotate the motor 42 in a particular direction and at a particular speed based on other factors).

However, if the user leaves the utility vehicle 20 unattended and the timer 132 reaches the predefined idle time threshold, the timer 132 expires (a sleep event) and sends a sleep event signal to the control logic 130. In response to the sleep event signal, the control logic 130 terminates output of the actuation signal 136 thus opening the contactor 106 to disconnect the rechargeable battery 52 from the motor system 30 (FIG. 3) and protecting the rechargeable battery 52 against further discharge.

In accordance with some embodiments, if the BMS 50 has fallen asleep and the maintenance switch 260 (FIG. 5) remains in the ON position, the user is able to wake the BMS 50 by moving the keyed switch 270 to the ON position (another wakeup event). Likewise, in accordance with some embodiments, if the BMS 50 has fallen asleep and the maintenance switch 260 and the keyed switch 270 are both in the ON position, the user is able to wake the BMS 50 by actuating the pedal 280 (yet another wakeup event).

In some embodiments and with reference to FIG. 5, the series configuration of the maintenance switch 260, the keyed switch 270, and the accelerator pedal 280 enables the maintenance switch 260 to disable sensing of the keyed switch 270 and the accelerator pedal 280. In particular, when the maintenance switch 260 is in the OFF position, the keyed switch 270 and the accelerator pedal 280 are unable to provide input to the control logic 130 of the wakeup circuit 104 thus preventing the user from waking up the BMS 50 via the keyed switch 270 or the pedal 280 while the maintenance switch 260 is in the OFF position.

Similarly, when the keyed switch 270 is in the OFF position, the accelerator pedal 280 is unable to provide input to the control logic 130 of the wakeup circuit 104. Accordingly, the user cannot wake up the BMS 50 simply by pushing on the accelerator pedal 280 while the keyed switch 270 is in the OFF position.

In some embodiments, while the maintenance switch 260 is in the ON position and the BMS 50 is awake, the motor system 30 and the BMS 50 operate to provide a walkaway protection feature that prevents the utility vehicle 20 from inadvertently rolling away at a high rate of speed. Along these lines, suppose that the user forgets to mechanically engage a brake to hold the utility vehicle 20 in place. If the utility vehicle 20 is perched on a hill and begins to roll, the motor system 30 senses that the utility vehicle 20 is moving but that the user is not pressing on the accelerator pedal 280. Accordingly, the motor system 30 of such embodiments provides proactive speed control and regenerative power. The proactive speed control maintains motor rotation at a low speed thus enabling the user to walk up to and stop the utility vehicle 20. Furthermore, the regenerative power recharges the rechargeable battery 52 thus improving efficiency.

Additional Details

Figure 7:
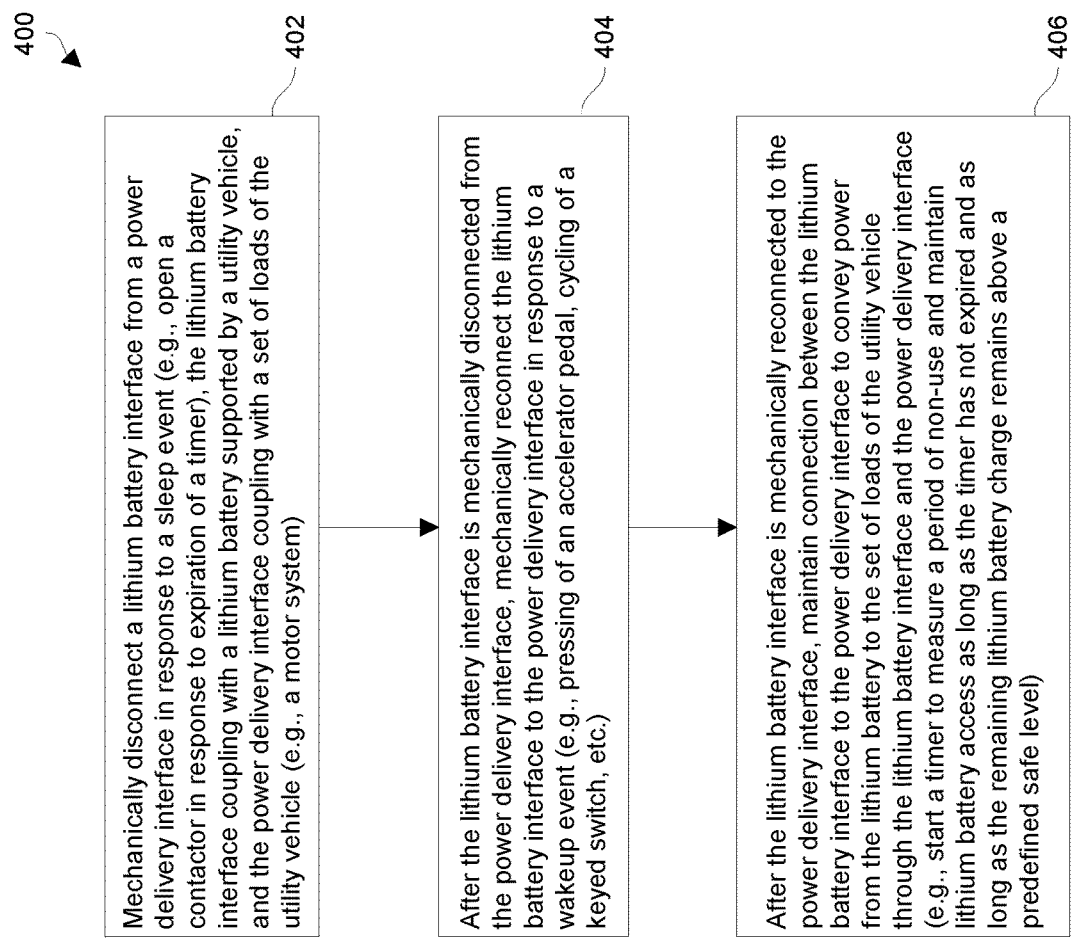
FIG. 7 is a flowchart of a procedure which is performed by the battery management system of the utility vehicle of FIG. 1 in accordance with some example embodiments.

FIG. 7 is a flowchart of a procedure 400 which is performed by the battery management system (BMS) 50 of the utility vehicle 20 to control access to the rechargeable battery 52 in accordance with some example embodiments.

At 402, the BMS 50 mechanically disconnects a rechargeable battery interface from a power delivery interface in response to a sleep event. The rechargeable battery interface couples with a rechargeable battery supported by the utility vehicle, and the power delivery interface couples with a set of loads of the utility vehicle. For example, a timer of the wakeup circuit may expire after a period of non-use thus indicating that the BMS 50 may disconnect the rechargeable battery 52 without interfering with a user of the utility vehicle 20. Such disconnection prevents parasitic loads from further draining the rechargeable battery 52.

At 404, after the rechargeable battery interface is mechanically disconnected from the power delivery interface, the BMS 50 mechanically reconnects the rechargeable battery interface to the power delivery interface in response to a wakeup event. For example, in accordance with some embodiments and in response to certain conditions, the user may press an accelerator pedal or cycle a keyed switch to wakeup the BMS 50.

At 406, after the rechargeable battery interface is mechanically reconnected to the power delivery interface, the BMS 50 maintains connection between the rechargeable battery interface and the power delivery interface to convey power from the rechargeable battery 52 to the set of loads of the utility vehicle through the rechargeable battery interface and the power delivery interface. In particular, the BMS 50 may start a timer to measure a period of non-use and maintain rechargeable battery access as long as the timer does not expire and as long as the rechargeable battery does not discharge below a predefined safe level.

As described above, improved techniques are directed to controlling electrical access to rechargeable batteries 52 on utility vehicles 20. Such techniques provide the ability to automatically disconnect the rechargeable batteries 52 from loads in response to timeout or sleep events. Such operation prevents the rechargeable batteries 52 from discharging even due to parasitic loads while the utility vehicles 20 are idle. Accordingly, the rechargeable batteries 52 will not discharge to unnecessarily low levels (e.g., safeguard levels). As a result, such operation robustly and reliably prevents the rechargeable batteries 52 from being recharged after being over-discharged and thus safeguards the rechargeable batteries 52 against becoming unstable.

Charging

Figure 8:
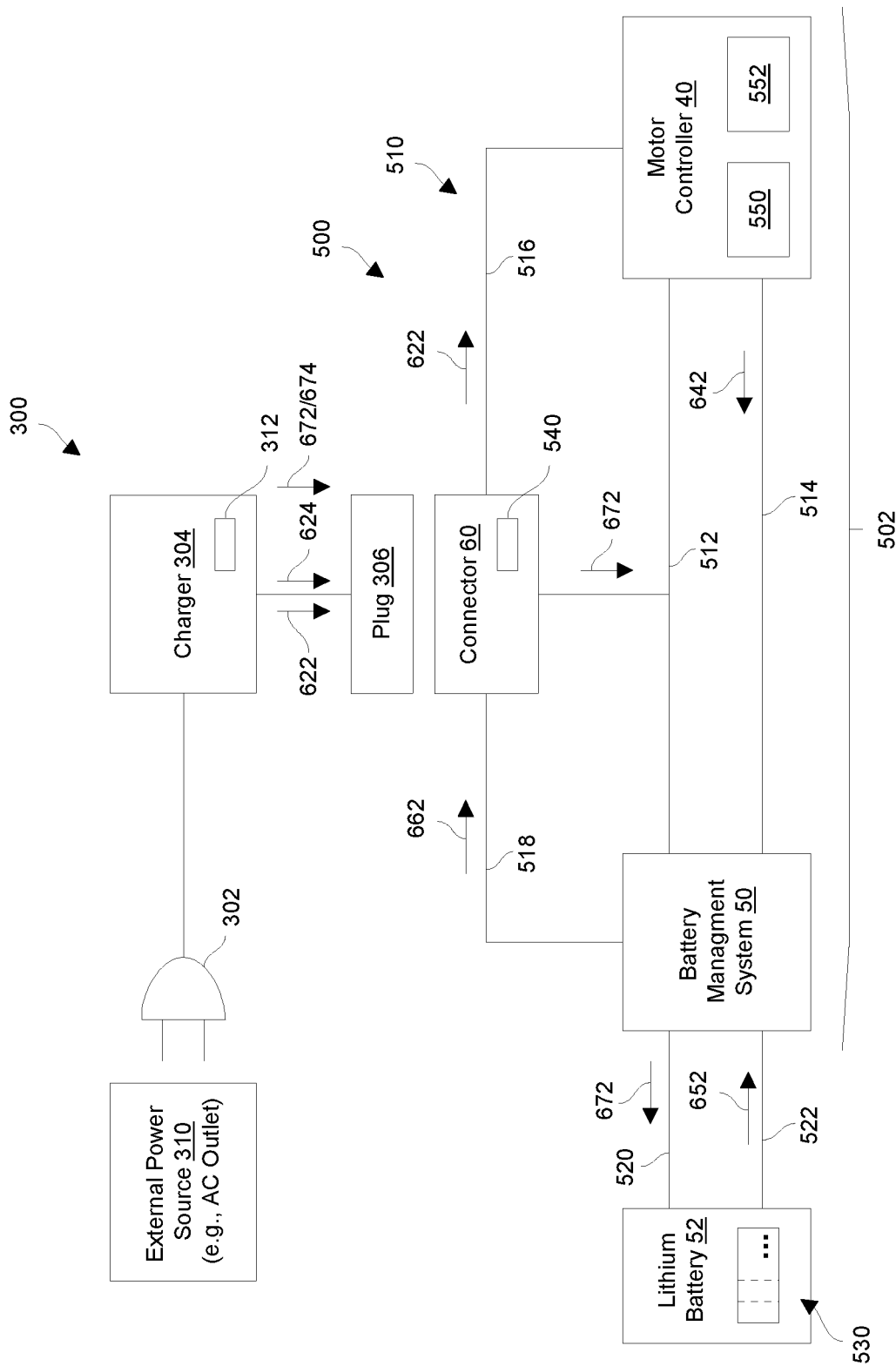
FIG. 8 is a block diagram of particular charging circuitry of the utility vehicle of FIG. 1 in accordance with some example embodiments.

FIG. 8 shows particular details of an external charger 300 and a charging system 500 of the utility vehicle 20. The external charger 300 includes a first plug 302, a charger (or adaptor) 304, and a second plug 306. The first plug 302 is constructed and arranged to connect the charger 304 to an external power source 310 such as an AC outlet. The second plug 306 is constructed and arranged to connect the charger 304 to the charging connector 60 of the utility vehicle 20 (also see FIG. 2). The charger 304 is constructed and arranged to convert and condition a power signal from the external power source 310 for use by the utility vehicle 20.

In some embodiments, the charger 304 includes a display 312 to display information to a user. Along these lines, the display 312 may include light emitting diodes (LEDs) of different colors (e.g., green, red, etc.).

As shown in FIG. 8 and in accordance with some embodiments, the charging system 500 of the utility vehicle 20 is formed by the connector 60 (e.g., a receptacle or plug), the rechargeable battery 52, and control circuitry 502. Furthermore, the control circuitry 502 is formed by the BMS 50 and at least a portion of the motor controller 40.

Although some of the connecting pathways may have been mentioned and/or illustrated earlier, the various components of the charging system 500 couple via a variety of pathways 510 (also see the cabling 38 in FIG. 1). In some embodiments, the connector 60 couples with the motor controller 40 and the BMS 50 via a power bus 512. In some embodiments, the motor controller 40 and the BMS 50 communicate over a communications bus 514. In some embodiments, the connector 60 further couples with motor controller 40 via an interlock signal pathway 516. In some embodiments, the connector 60 further couples with BMS 50 via a control signal pathway 518.

Additionally, in some embodiments, the BMS 50 couples with the rechargeable battery 52 via a power pathway 520, and a set of communications pathways 522. The power pathway 520 carries power to and from the rechargeable battery 52. The set of communications pathways 522 enables the BMS 50 to receive information (e.g., battery status such as voltage and temperature measurements) from the rechargeable battery 52.

As further shown in FIG. 8 and in accordance with some embodiments, the rechargeable battery 52 includes multiple rechargeable modules 530. Each rechargeable module 530 may include several rechargeable cells as well as circuitry to output individual status such as that module's minimum and maximum voltage, that module's minimum and maximum temperature, etc.

In some embodiments, the connector 60 includes a display 540 to indicate charging information to a user. In certain embodiments, the display 540 includes an LED that provides status to the user via different blinking or flashing patterns. In accordance with some embodiments, in response to different charging commands that the external charger 300 receives from the utility vehicle 20, the external charger 30 may flash or not flash the LED at different rates (e.g., a first speed to indicate charging at a normal rate, a second speed to indicate charging at a slow rate, and no flashing to indicate that the external charger 300 is not charging the rechargeable battery 52, etc.).

In some embodiments, the motor controller 40 includes detection circuitry 550 and electric brake control circuitry 552. The detection circuitry 550 is configured to detect connection between the external charger 300 and the connector 60 and convey such connection status to the BMS 50. The electric brake control circuitry 552 is configured to control power to the electric brake 44 (FIG. 2). Further charging details will be provided with reference to FIGS. 8 and 9.

Figure 9:
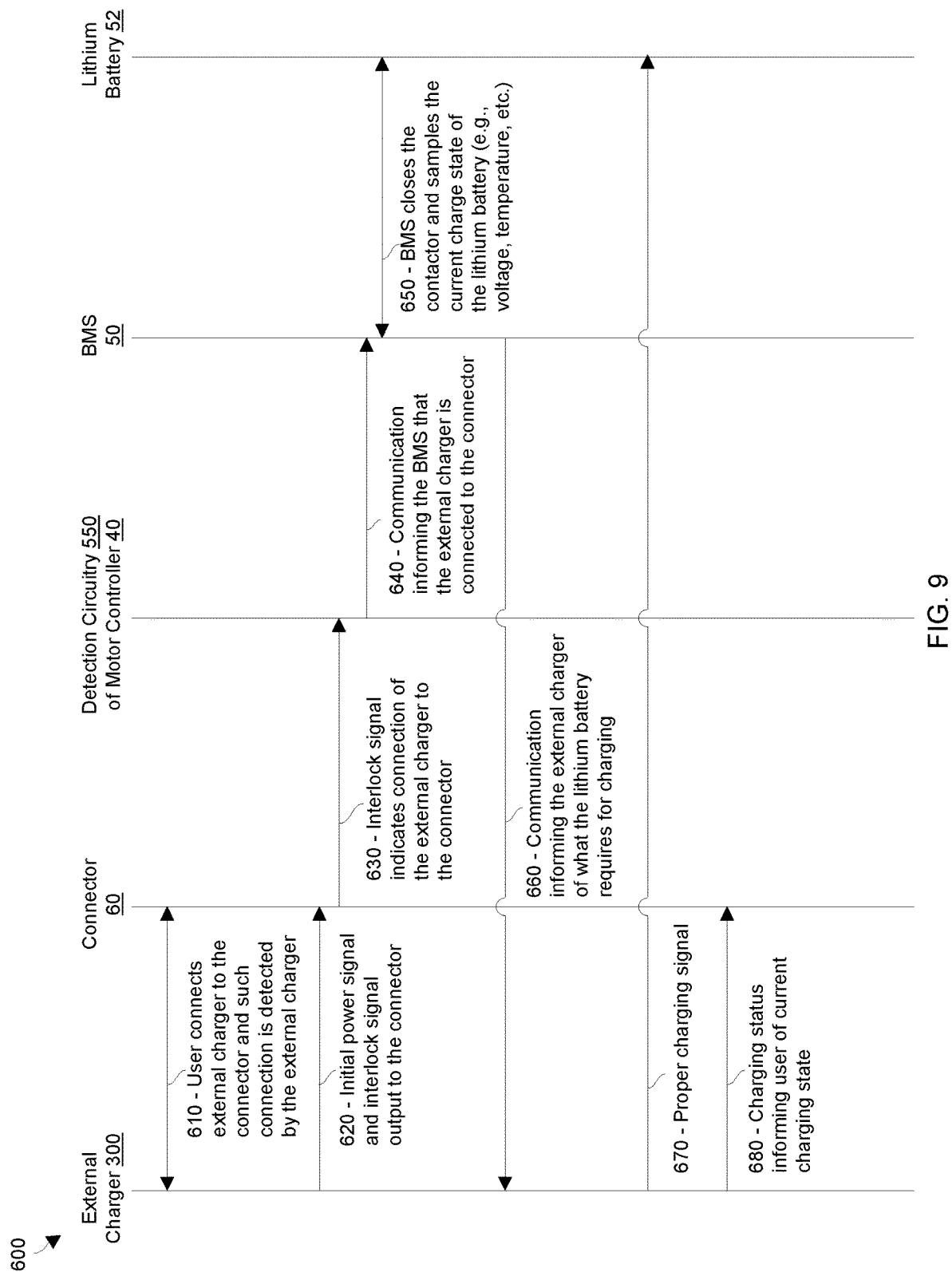
FIG. 9 is a sequence diagram illustrating particular charging activities that occur during rechargeable battery charging in accordance with some example embodiments.

FIG. 9 shows a sequence diagram 600 showing particular charging activities that occur during rechargeable battery charging in accordance with some embodiments. Suppose that a user wishes to charge the rechargeable battery 52 of the utility vehicle 20. In particular, the user may be ready to connect the external charger 300 to the connector 60 of the utility vehicle 20.

At 610, the user connects the external charger 300 to the connector 60 of the utility vehicle 20. In some embodiments, it does not matter whether the user plugs the external charger 300 into the external power source 310 (e.g., an AC outlet) before or after the user engages the plug 306 with the connector 60. Rather, the external charger 300 is considered properly connected to the connector 60 of the utility vehicle 20 once both events have occurred, i.e., the user has plugged the external charger 300 into the external power source 310 and the user engaged the plug 306 with the connector 60 (also see FIG. 8).

At 620, in response to the user plugging the external charger 300 into the external power source 310 and engaging the plug 306 with the connector 60, the external charger 300 outputs (i) an initial power signal 622 and (ii) an interlock signal 624 to the utility vehicle 20 (FIG. 8). In some embodiments, the initial power signal 622 is a temporary pulse (e.g., a 48 Volt power signal for a duration of six seconds). If the motor controller 40 and the BMS 50 are initially asleep, this initial power signal 622 wakes the motor controller 40 and the BMS 50 (e.g., the motor controller 40 and the BMS 50 power up and perform self-tests, the motor controller 40 and the BMS 50 perform sensing, etc.).

At 630, with the interlock signal 624 from the external charger 300 present at the connector 60 due to connection of the external charger 300 with the connector 60, the motor controller 40 detects the presence of the interlock signal 624 via the interlock signal pathway 516. In some embodiments, the detection circuitry 550 of the motor controller 40 tries to raise the interlock signal pathway 516 to a predefined voltage and a transistor in the connector 60 pulls that predefined voltage on the interlock signal pathway 516 low (e.g., to ground) in the absence of the external charger 300. When the user connects the external charger 300 to the connector 60, the transistor in the connector stops pulling the predefined voltage on the interlock signal pathway 516 low in response to the interlock signal 624 from the external charger 300. As a result, the detection circuitry 550 detects that the external charger 300 is connected to the connector 60.

At 640, in response to detecting connection of the external charger 300 with the connector 60, the control circuitry 550 of the motor controller 40 sends a communication 642 (FIG. 8) to the BMS 50 informing the BMS 50 that the external charger 300 is connected to the connector 60. In some embodiments, the communication 642 is a CAN message that the motor controller 40 sends to the BMS 50 via a CAN bus (also see communications 70 in FIG. 2).

At 650, in response to the communication 642, the BMS 50 closes its contactor 106 (FIG. 3) and ascertains the current charge state of the rechargeable battery 52. In some embodiments, the BMS 50 routinely samples a current set of operating conditions 652 (FIG. 8) from the rechargeable battery 52 such as minimum and maximum voltage, minimum and maximum temperature, etc.

At 660, based at least in part on the current set of operating conditions 652, the BMS 50 provides a control signal 662 to the external charger 60 (e.g., through the power bus 512, on the control signal pathway 518, etc., also see FIG. 8). In some embodiments, the control signal 662 informs the external charger 300 of what the rechargeable battery 52 requires for proper charging based on the condition of the rechargeable battery 52.

At 670, if the rechargeable battery 52 requires charging, the external charger 60 provides a proper power signal 672 (FIG. 8) to the rechargeable battery 52 based on the control signal 662. Additionally, in some embodiments and at 680, the external charger 60 provides a status signal 674 to the display 540 of the connector 60 to inform the user of the charging status (e.g., a slow blinking LED for a slow charge rate, a fast blinking LED for a normal charge rate, a solid LED for no charging due to the rechargeable battery being at full capacity, etc.). In some embodiments, the control signal 662, the interlock signal 624, and the status signal 674 are multiplexed through a cable connecting the charger 304 to the connector 60. In other embodiments, the control signal 662 is conveyed from the utility vehicle 20 to the charger 304 along the same set of charge delivery conductors that deliver charge from the charger 304 to the utility vehicle 20.

This above-described operation may continue until the rechargeable battery 52 is fully charged (e.g., repeating 630 through 670). In some embodiments, the BMS 50 is configured to routinely monitor the current charge state of the rechargeable battery 52 over time. If the BMS 50 determines that the rechargeable battery 52 requires different charging, the BMS 50 provides an appropriate control signal 662 to the external charger 300 directing the external charger to provide a proper power signal 672. It will be appreciated that such routine monitoring may encompass monitoring the current charge state of the rechargeable battery 52 over any of a variety of time intervals, including, for example, monitoring at various periodic intervals, monitoring at aperiodic intervals of varying time length, and/or in some embodiments, constant monitoring during one or more time periods. If the BMS 50 determines that the rechargeable battery 52 is fully charged, the BMS 50 provides an appropriate control signal 662 informing the external charger 300 to stop providing the power signal 672.

In some embodiments, the BMS 50 routinely samples, from all of the rechargeable modules 30, a current overall minimum voltage and a current overall maximum voltage. The BMS 50 compares these samples to a set of predefined voltage thresholds to determine whether the rechargeable battery 52 requires further charging or if the rechargeable battery 52 is fully charged. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

Additionally, in some embodiments, the BMS 50 routinely samples, a respective minimum temperature and a respective maximum temperature from each module 530. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

The BMS 50 further determines an overall current minimum temperature and an overall current maximum temperature for the rechargeable battery 52 as a whole from all of the respective module measurements. The BMS 50 compares these overall measurements to a set of predefined temperature thresholds to determine an appropriate rate of charge if any (also see the configuration data 226 in FIG. 4). For example, in accordance with some embodiments, the BMS 50 considers the rechargeable battery 52 ready to receive charging from the external charger 300 at a normal rate if the temperatures reside within a temperature range of 5 degrees Celsius to 45 degrees Celsius. Additionally, in accordance with some embodiments, the BMS 50 considers the rechargeable battery 52 ready to receive charging from the external charger 300 at a slow rate (i.e., a rate which is slower than the normal rate) if the temperatures reside within a suboptimal temperature range of −10 degrees Celsius to 5 degrees Celsius or within a suboptimal temperature range 45 degrees Celsius to 60 degrees Celsius (i.e., outside the range of 5 degrees Celsius to 45 degrees Celsius but within the range of −10 degrees Celsius to 60 degrees Celsius). Furthermore, in accordance with some embodiments, the BMS 50 considers the rechargeable battery 52 not ready to receive charging from the external charger 300 (i.e., a fault situation) if the temperatures reside outside the temperature range of −10 degrees Celsius to 60 degrees Celsius.

In some embodiments, the control signal 662 takes the form of a pulse width modulation (PWM) signal to imitate electrical behavior of a thermistor. Here, the BMS 50 outputs signals of different pulse widths to convey, as commands to the external charger 300, the different charging requirements of the rechargeable battery 52 (e.g., full, charge at a slow rate, charge at a normal rate, or fault).

In other embodiments, the control signal 662 takes the form of voltage and/or current changes through the power bus 512. Here, the BMS 50 opens and closes the contactor 106 (FIG. 3) to convey, as commands to the external charger 300, the different charging requirements of the rechargeable battery 52 (e.g., full, charge at a slow rate, charge at a normal rate, or fault). In some embodiments, the external charger 300 echoes back the commands to inform the BMS 50 that the external charger 300 has correctly received the commands from the BMS 50.

In some embodiments, if the charging criteria changes over time and the external charger 300 updates the power signal 672, the external charger 300 also updates the status signal 674 to the display 540 of the connector 60. Accordingly, the user is able to identify whether the rechargeable battery 52 is charging and, if so, at what current rate.

When the BMS 50 informs the external charger 300 that the rechargeable battery 52 should not be charged, the external charger 300 terminates the power signal 672 and sets its display 312 accordingly. In some embodiments, when the BMS 50 informs the external charger 300 that the rechargeable battery 52 is fully charged, the external charger 300 terminates the power signal 672 and provides a visual indication (e.g., lights a green LED) to inform the user. In some embodiments, when the BMS 50 informs the external charger 300 that the rechargeable battery 52 should not be charged due to a fault condition (e.g., a temperature reading outside a predefined temperature range), the external charger 300 terminates the power signal 672 and provides a visual indication (e.g., lights a red LED) to inform the user.

In response to determining that the rechargeable battery 52 is fully charged, the BMS 50 notifies the external charger 300 and goes to sleep by opening the contactor 106 (FIG. 3). In some embodiments, the BMS 50 may remain awake for a short time after the rechargeable battery 52 is fully charged. Along these lines, the control logic 130 of the BMS 50 may use the timer 132 (FIG. 3) to monitor inactivity time and then go to sleep if there is no further sensed electronic activity by the utility vehicle 20 before the timer 132 times out. That is, in response to expiration of the timer 132, the BMS 50 opens the contactor 106 and goes to sleep.

It should be understood that the various timeout times imposed by the timer 132 may be of different lengths depending on the particular circumstances. For example, the amount of time used by the timer 132 to monitor inactivity after rechargeable battery charging may be different from the amount of time used by the timer 132 to monitor inactivity after other events such as after the user has cycled the keyed switch 270 and/or after the user has let up on the accelerator pedal 280 after driving the utility vehicle 20. In some embodiments, the timer 132 uses a shorter timeout period to monitor inactivity in response to the rechargeable battery 52 being charged to full capacity.

In some embodiments, the pull-down transistor feature of the connector 60 operates as a safeguard in the event that the connector 60 is damaged and disconnects from the motor controller 40. In such a situation, the detection circuitry 550 of the motor control 40 will detect a high signal on the interlock signal pathway 516 since the detection circuitry 550 raises the voltage to a predefined level and the transistor in the connector is unable to pull that signal down due to disconnection.

In some embodiments, when the detection circuitry 550 of the motor controller 40 detects connection between the external charger 300 and the connector 60 (e.g., due to the presence of the interlock signal 624 on the interlock signal pathway 516), the detection circuitry 550 causes the electric brake control circuitry 552 to prevent the electric brake 40 from energizing (also see FIG. 8). Accordingly, the utility vehicle 20 remains stationary. Further details will now be provided with reference to FIG. 10.

Figure 10:
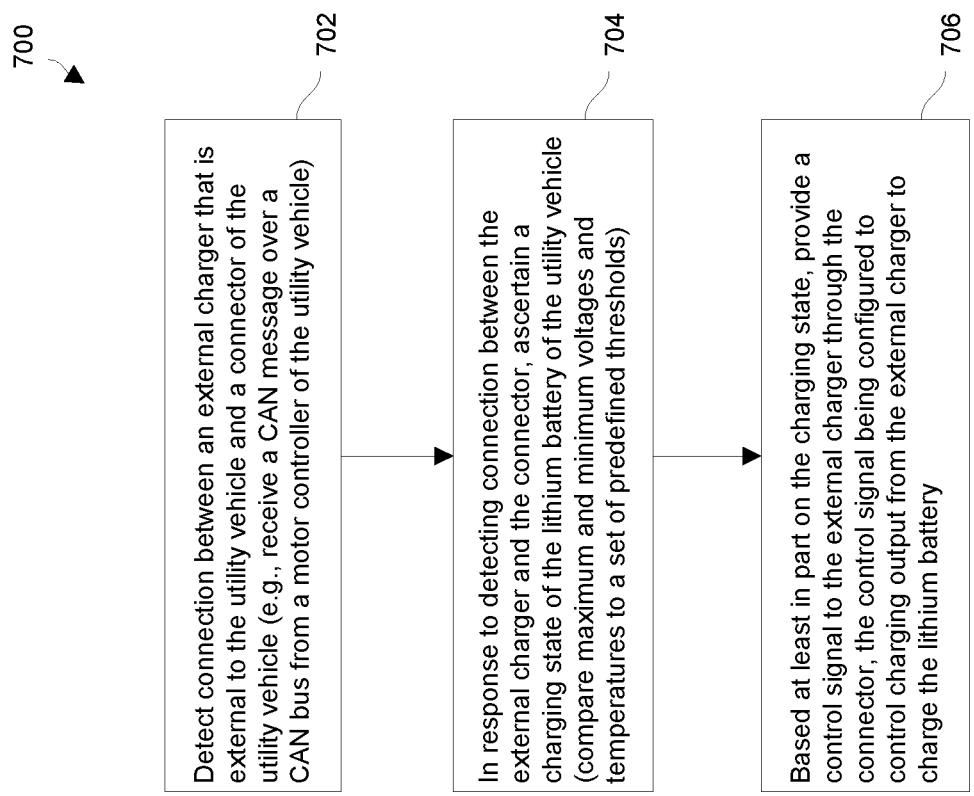
FIG. 10 is a flowchart of a procedure which is performed by circuitry of a utility vehicle during rechargeable battery charging in accordance with some example embodiments.

FIG. 10 is a flowchart of a procedure 700 which is performed by circuitry of a utility vehicle during rechargeable battery charging in accordance with some example embodiments. In some embodiments, the procedure 700 begins simply in response to a human user connecting an external charger to a connector of the utility vehicle.

At 702, the circuitry detects connection between an active external charger and a connector of the utility vehicle. In some embodiments, a motor controller of the utility vehicle provides a communication (e.g., a CAN message) to a BMS of the utility vehicle informing the BMS that the connector is connected to the external charger.

At 704, in response to detecting connection between the external charger and the connector, the circuitry ascertains a charging state of the rechargeable battery. In some embodiments, the circuitry samples maximum and minimum voltages and temperatures from individual rechargeable modules that form the rechargeable battery and compares these samples to a set of predefined thresholds to determine the current charging state of the rechargeable battery.

At 706, based at least in part on the charging state, the circuitry provides a control signal to the external charger through the connector. The control signal is configured to control charging output from the external charger to charge the rechargeable battery. In some embodiments, the external charger provides one of multiple different responses based on the control signal (e.g., terminate the charging signal due to the rechargeable battery being fully charged, provide a charge signal at a slow charge rate, provide a charge signal at a normal rate, terminate the charging signal due to a fault, etc.).

If the external charger is providing a charge signal to charge the rechargeable battery, the circuitry repeats 704 and 706. It will be appreciated that repetition of operations 704 and 706 may be performed at any of a variety of time intervals, including, for example, various periodic intervals, aperiodic intervals of varying time length, and/or in some embodiments, constant sampling during one or more time periods. As a result, the external charger continues to provide a charge signal and the rechargeable battery continues to charge.

When the rechargeable battery is fully charged, the circuitry detects this situation (e.g., based on monitoring the charging state of the rechargeable battery), and causes the external charger to terminate the charging signal. Additionally, the circuitry goes to sleep (e.g., after a short period of time) to prevent unnecessary discharging of the rechargeable battery.

As described above, improved techniques are directed to charging a rechargeable battery 52 of a utility vehicle 20 where a human user is able to initiate charging by simply connecting an external charger 300 to the utility vehicle 20. Such techniques do not require further human user input. Rather, the utility vehicle 20 is able to automatically respond by conveying charge from the external charger 300 to the rechargeable battery 52 and disconnecting the rechargeable battery 52 once the rechargeable battery 52 is fully charged. Accordingly, the human user does not need to remember to actuate a charge-enable switch and does not need to receive special training on how to operate such a switch.

In accordance with some embodiments, a charging system controls charging of a rechargeable battery powered car. Various features include charging initiation by plugging in charger only, dynamic charge rate adjustment based at least in part on battery temperature, and communication of status, control, and fault conditions between the BMS and charger.

In some embodiments, the components of the charging system include an off board battery charger, charger plug, charger connector, and BMS. The rechargeable battery couples with the BMS which disconnects the pack from the car when the car is not being used.

Conventional rechargeable battery powered vehicles require the operator to actuate a switch that tells the BMS to reconnect to the vehicle electrical system for charging. If the operator forgets to actuate the switch then the batteries won't charge.

However, in accordance with certain embodiments disclosed herein, the charge sequence is initiated by plugging the charger plug into the charge connector only. No other operator input is required. To accomplish this, the charger senses the plug being plugged into the connector. The charger then applies a 6 second, 48 volt pulse to power the entire vehicle electrical system. This wakes up the BMS and the motor controller.

In some embodiments, the BMS does not have a direct input from the charger or connector indicating whether the charger is plugged in. Rather, the motor controller senses that the charger is plugged in through an interlock signal from the connector. The motor controller sends a message (e.g., a CAN message) to the BMS that the charger is plugged in. When the BMS receives this signal it closes its contactor to reconnect the batteries to the vehicle electrical system. As long as this signal is valid, the BMS will remain connected. Charging can then take place.

For some lead acid battery powered vehicles, the lead acid battery charger uses a thermistor on the batteries to sense battery temperature. Battery temperature is used to adjust certain charge parameters in the charger. The thermistor is connected to the charge connector which multiplexed the thermistor reading, the connector LED control, and charger interlock signals onto a single wire to the charger. For the lithium batteries, the thermistor signal may be repurposed into a charge control signal. A transistor can be added to the BMS which imitates a thermistor by using pulse width modulation (PWM). In some embodiments, the PWM duty cycle is divided into 4 distinct levels that represent Charger Full, Charging Allowed at a Slow Rate, Charging Allowed at the Normal Rate, and Fault. In some embodiments, the BMS allows full charge rate within a normal range of battery cell temperatures (5 to 45 degrees C.). In some embodiments, the slow charge rate is allowed over a slightly wider cell temperature range (−10 to 5, and 45 to 60 degrees C.). No charging is allowed outside of the wide temperature range. The system dynamically adjusts charge rates based on temperature with no operator input. When charging is complete, the BMS signals Charger Full to the charger, which terminates charging. The charger responds to a fault signal by lighting a fault indicator LED on the charger.

In accordance with some embodiments, system components include the charger, charger plug, charger connector, BMS, motor controller, and vehicle switches. The BMS and the motor controller communicate over the CAN bus. In some embodiments, the BMS monitors the status of 3 switch inputs: key switch, pedal switch, and park brake release switch. In some embodiments, the motor controller monitors the status of a Run/Tow switch. In some embodiments, the BMS sends a PWM signal to the charger via the charger plug and connector. The connector drives a charger interlock signal that is monitored by the motor controller. An LED on the connector is controlled by the charger and indicates charge status. The LED, interlock, and PWM signals are all multiplexed onto a single wire from the charger to the charger plug and connector. Circuits inside the charger and connector encode and decode the signals. For lithium, a lead acid battery temperature signal was not needed and was replaced by the PWM signal which relays status information from the BMS to the charger.

In accordance with some embodiments, when the charger is plugged into the car, charging initiates regardless of whether the BMS is asleep or awake. If the BMS is awake, plugging in the charger asserts the charger interlock signal from the charge connector to the motor controller. In some embodiments, the motor controller informs the BMS that the charger is plugged in via a status bit in a message (e.g., a CAN message). The BMS then sets the PWM signal appropriately (when not charging, the BMS sets the PWM signal to the Fault mode as a failsafe). Charging can then take place. The BMS stays awake until charging is complete, and goes to sleep shortly after charging is complete. Accordingly, the BMS knows that the charger is plugged in and can monitor for fault and warning conditions. If the charger is plugged into a vehicle where the BMS is asleep, then the charger provides power to the vehicle's electrical system. This wakes up the BMS and the motor controller. If the BMS receives a message (e.g., a CAN message) from the motor controller with the charging status bit set, then it will close its contactor and set the PWM signal appropriately. Charging then commences.

Additionally, it should be understood that the keyed switch was described above as being used in certain example embodiments. It will be appreciated that the keyed switch is just one example of an ignition switch that may be used in various embodiments. For example, in other example embodiments, the vehicle uses a keyless, push-button ignition rather than a keyed switch. Such ignition is enabled when an "electronic key" (e.g., an RF device) on the passenger's person is within range of a wireless sensor of the vehicle. Here, an actuation of the switch occurs through presence of the electronic key in combination with physical actuation of the button.

Furthermore, in some embodiments, the BMS 50 utilizes an inactivity timer that measures inactivity time based on current (also see the timer 132 in FIG. 3). For example, the inactivity timer starts timing inactivity when current sensed from the rechargeable battery falls below a predefined current threshold (e.g., 3 amps). As long as the current remains below this predefined current threshold, the inactivity timer continues to measure time. However, if the current rises above the predefined current threshold, the inactivity timer is cleared (or reset) because this rise in current above the predefined current threshold is considered detected activity. The inactivity timer then starts counting again when current falls below the predefined current threshold. If the inactivity timer ever reaches a timeout value, the inactivity timer is considered to have expired (i.e., detected an inactivity timeout event).

Communication Between Rechargeable Battery Control Circuitry and a Charger

Figure 11:
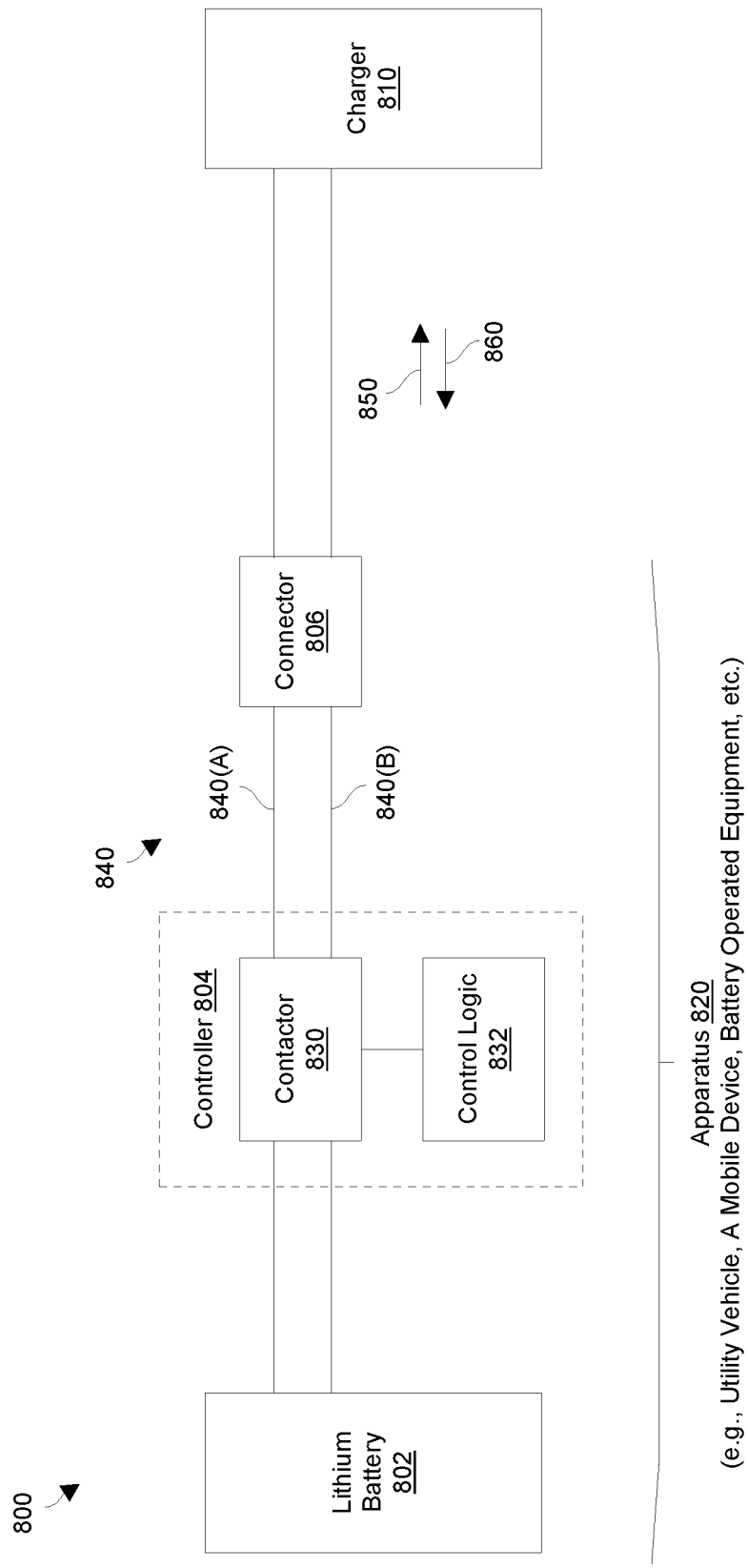
FIG. 11 is a block diagram of a charging system which includes a rechargeable battery powered apparatus having a controller that is operative to communicate with a charger through a set of charge delivery pathways in accordance with some example embodiments.

FIG. 11 shows particular details of a charging system 800 which charges a rechargeable battery based on communication that occurs between rechargeable battery control circuitry and a charger over a set of charge delivery pathways. The charging system 800 includes a rechargeable battery 802, a controller 804, a connector (or connector) 806, and a charger 810. In some embodiments, the rechargeable battery 802, the controller 804, and the connector 806 form part of an apparatus 820 (e.g., a utility vehicle, a mobile device, battery operated equipment, etc.). The controller 804 includes a contactor 830 and control logic 832 which operate to control a set of one or more charge delivery pathways, such as charge delivery pathways 840(A), 840(B), (collectively, pathways 840) that electrically connects the rechargeable battery 802 to the connector 806 and the charger 810.

In the context of the earlier-described utility vehicle 20, the rechargeable battery 52 of the rechargeable battery system 32 is suitable for the rechargeable battery 802, the battery management system 50 is suitable for the controller 804, and the charging connector 60 is suitable for the connector 806 (also see FIG. 2). Here, the earlier-described external charger 300 is suitable for the charger 810 (also see FIG. 8). Moreover, the earlier-described contactor 106 is suitable for the contactor 830 of the controller 804, and the earlier-described control logic 130 is suitable for the control logic 832 of the controller 804 (also see FIG. 3).

During operation, the controller 804 senses an event such as connection of the charger 810 to the connector 806 and an initial power signal that wakes up the controller 804. When the controller 804 wakes up, the controller 804 evaluates the charging needs and the environmental conditions of the rechargeable battery 802 and communicates a message 850 to the charger 810 through the set of charge delivery pathways 840 informing the charger 810 of a proper charging mode for the rechargeable battery 802. The charger 810 then provides a notification 860 back to the controller 804 through the set of charge delivery pathways 840 informing the controller 804 of proper receipt of the message 850.

Over time, the controller 804 and the charger 810 may further communicate (e.g., every 30 minutes, every hour, etc.) to update each other regarding operation and status (i.e., via further messages 850 and notifications 860). For example, the temperature of the rechargeable battery 802 may change thus imposing a requirement that the rechargeable battery 802 charge at a slower rate, and subsequent communications enable the controller 804 to communicate this new requirement to the charger 810. As another example, the rechargeable battery 802 may reach its proper final charge level, and the controller 804 may inform the charger 810 to stop charge delivery, etc.

In some embodiments, the controller 804 provides the messages 850 through the pathways 840 by opening and closing the contactor 830. Such operation is then sensed by the charger 810 (e.g., via voltage sensing, current sensing, combinations thereof, etc.). Likewise, the charger 810 provides the notifications 860 to the controller 804 in a manner which can be sensed by the controller 804 (e.g., via voltage sensing, current sensing, combinations thereof, etc.).

Additionally, in some embodiments, the charger 810 may be equipped to charge lithium batteries, as well as lead acid batteries (and/or perhaps other types of batteries that are not supported by any control circuitry). In some embodiments, the charger 810 may initially listen for a message 850 from the controller 804 to determine whether it should provide lithium battery charging or lead acid battery charging. Upon receipt of a message 850 from the controller 804, the charger 810 may transition from a lead acid charging mode (e.g., a default mode) to a lithium battery charging mode (e.g., an advanced or smart mode) and then carry out communications with the controller 804 to smartly control the amount of charge on the rechargeable battery 802. If the charger 810 does not receive any message after a predefined amount of time (e.g., two minutes, five minutes, etc.), the charger 810 may conclude that the load on the charger 810 is simply a lead acid battery.

Furthermore, in some embodiments, the controller 804 may modify operation based on notifications 860 from the charger 810. Along these lines, if the controller 804 does not receive a proper notification 860 back from the charger 810 (e.g., an expected echoing of the last sent message 850 from the controller 804), the controller 804 may perform remedial activity (e.g., error checking, opening of the contactor 830 as a precaution, sound an alarm, etc.). Further details will now be provided with reference to FIGS. 12 and 13.

Figure 12:
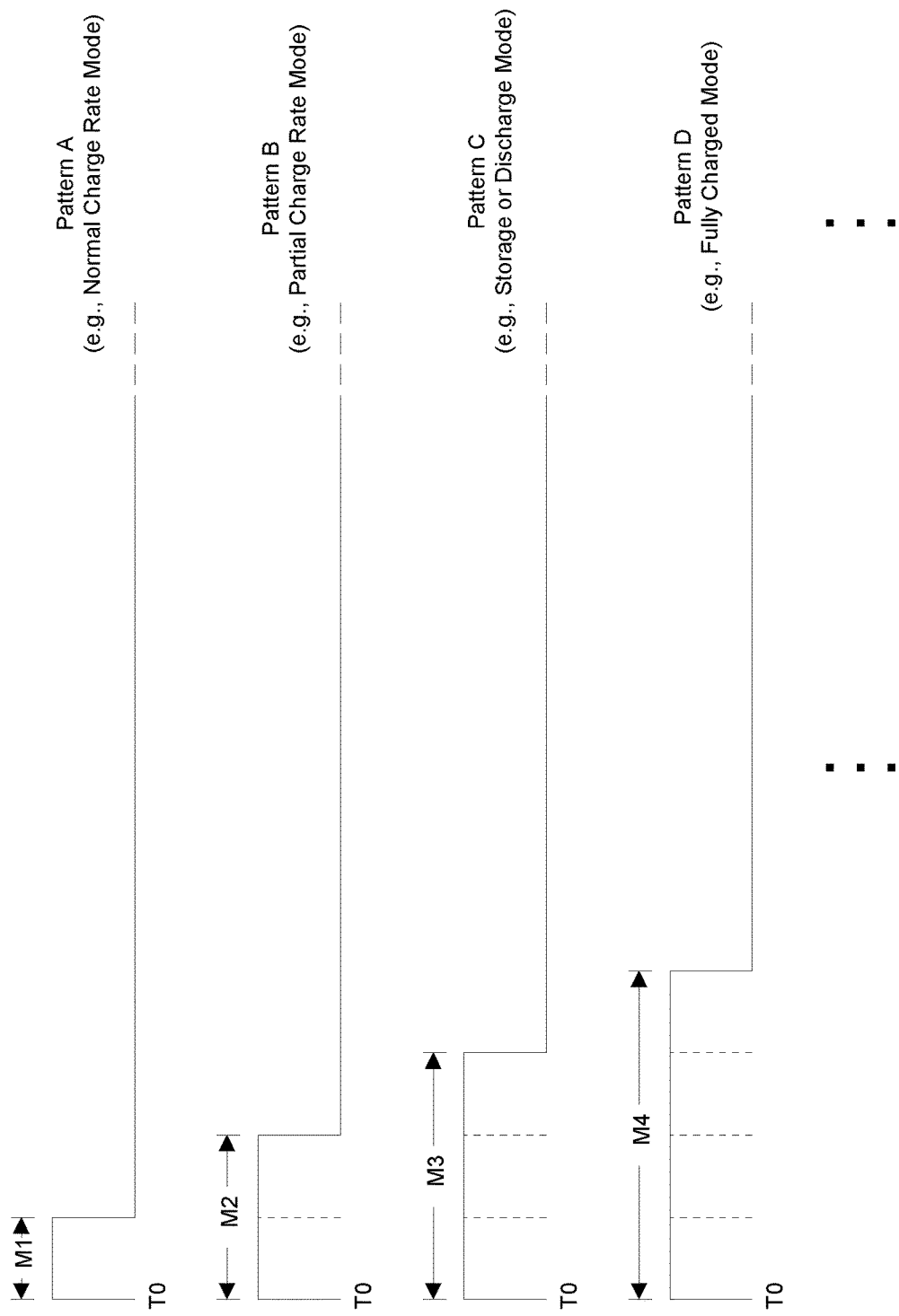
FIG. 12 is a diagram illustrating a first set of contactor signaling patterns in accordance with some example embodiments.
Figure 13:
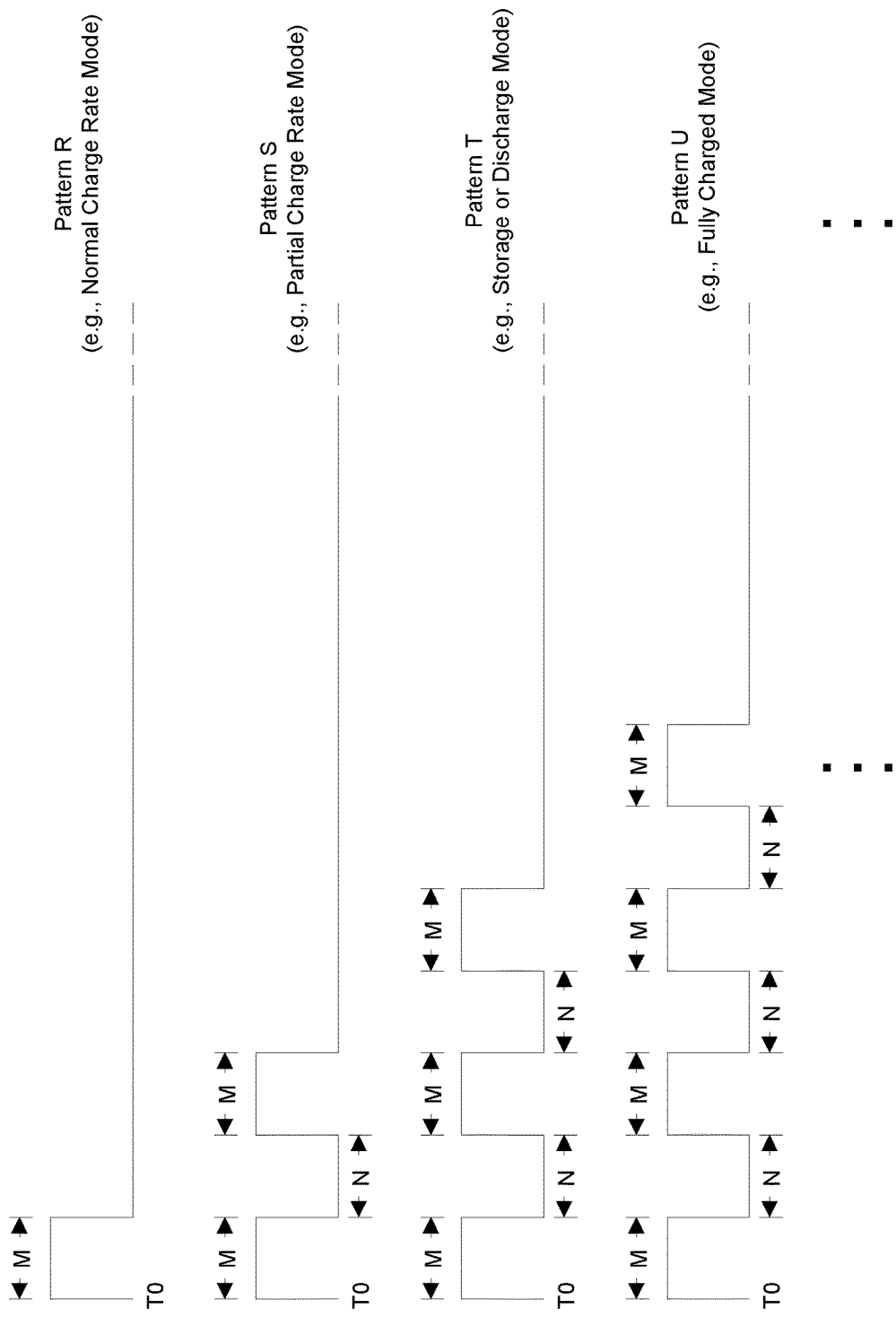
FIG. 13 is a diagram illustrating a second set of contactor signaling patterns in accordance with some example embodiments.

FIGS. 12 and 13 illustrate example signaling patterns that are suitable for use by the charging system 800 during communication between the controller 804 and the charger 810 (FIG. 11). FIG. 12 shows a first set of contactor signaling patterns in accordance with some embodiments. FIG. 13 shows a second set of contactor signaling patterns in accordance with some embodiments.

As shown in FIG. 12 and in accordance with some embodiments, the controller 804 is operative to produce a variety of signaling patterns 880 which differ based on time of assertion. The controller 804 may form such patterns 880 by opening and closing the contactor 830 (FIG. 11) while varying the length of time the contactor remains closed (or open), e.g., the amount of time in which the controller 804 maintains closure of the contactor 830.

Along these lines and in accordance with some embodiments, the controller 804 opens the contactor at time T0 for an amount of time. For pattern A, the contactor 804 remains closed (or open) for time M1. For pattern B, the contactor 804 remains closed (or open) for time M2. For pattern C, the contactor 804 remains closed (or open) for time M3. For pattern D, the contactor 804 remains closed (or open) for time M4, and so on.

In some embodiments and as shown in FIG. 12, each time interval is a multiple of a standard time interval (e.g., M2 is twice M1, M3 is three times M1, M4 is four times M1, and so on). However, in other embodiments, using a multiple of a standard time interval is not required, e.g., the time intervals are simply predefined and different.

In some embodiments, each pattern 880 indicates a different charging mode. By way of example only, pattern A indicates that the controller 804 has determined that the rechargeable battery 802 is in condition to receive charge at a normal charge rate, i.e., the controller 804 is operating in a normal charge rate mode. Additionally, pattern B indicates that the controller 804 has determined that the rechargeable battery 802 is in condition to receive charge at a partial charge rate which is slower than the normal charge rate, i.e., the controller 804 is operating in a partial charge rate mode. Furthermore, pattern C indicates that the controller 804 has determined that the rechargeable battery 802 is currently discharging for storage purposes and does not need charge from the charger 810, i.e., the controller 804 is operating in a storage or discharge mode. Also, pattern D indicates that the controller 804 has determined that the rechargeable battery 802 is fully charged and does not need charge from the charger 810, i.e., the controller 804 is operating in a fully charged mode. Of course, other modes are suitable for use as well, and the system 800 is capable of supporting a different number of modes (e.g., two modes, three modes, five modes, etc.). Further, the example correspondence between pattern and status indication is provided by way of example and not by way of limitation. Thus, it will be appreciated that illustrated patterns may indicate alternative statuses and/or illustrated statuses may be represented by alternative patterns.

It should be understood that the receiving circuitry (e.g., see the charger 810 in FIG. 11) can detect the patterns 880 via voltage sensing, current sensing, combinations thereof, etc. For example, if the pattern if sent by the controller 804 while the charger 810 is providing an initial charging signal on the set of charge delivery pathways 840 (FIG. 11), the charger 810 is nevertheless capable of sensing a particular pattern 880 in the message 850 on the pathways 840 via current sensing (i.e., a change in current through the pathways 840). Additionally, if the pattern is sent by the controller 804 while the charger 810 is not providing any charging signal on the pathways 840 (FIG. 11), the charger 810 is capable of sensing a particular pattern 880 in the message 850 on the pathways 840 via voltage sensing, and so on. Furthermore, the controller 804 is capable of sensing the notification 860 from the charger 810 in a similar manner.

As shown in FIG. 13 and in accordance with other embodiments, the controller 804 is operative to produce a variety of other signaling patterns 890 which differ based on the number of times the contactor 830 opens and closes. The controller 804 may form such patterns 890 by opening and closing the contactor 830 (FIG. 11), such as by closing and opening the contactor 830 a certain number of times within a predefined time window (e.g., 30 seconds, one minute, two minutes, three minutes, etc.).

Along these lines, starting at time T0, the controller 804 opens and closes the contactor 830 at least once. In particular, for pattern A, the controller 804 opens and closes the contactor once. For pattern B, the controller 804 opens and closes the contactor twice. For pattern C, the controller 804 opens and closes the contactor three times. For pattern D, the controller 804 opens and closes the contactor four times, and so on.

In some embodiments, the amount of time M is the same as the amount of time N (e.g., both M and N are 1 second, both M and N are 2 seconds, etc.). In other embodiments, M and N are different amounts of time (e.g., M is 1 second and N is 2 seconds, M is 2 seconds and N is 1 second, etc.).

By way of example only, pattern R indicates that the controller 804 has determined that the rechargeable battery 802 is in condition to receive charge at a normal charge rate, i.e., the controller 804 is operating in a normal charge rate mode. Additionally, pattern S indicates that the controller 804 has determined that the rechargeable battery 802 is in condition to receive charge at a partial charge rate which is slower than the normal charge rate, i.e., the controller 804 is operating in a partial charge rate mode. Furthermore, pattern T indicates that the controller 804 has determined that the rechargeable battery 802 is currently discharging for storage purposes and does not need charge from the charger 810, i.e., the controller 804 is operating in a storage or discharge mode. Also, pattern U indicates that the controller 804 has determined that the rechargeable battery 802 is fully charged and does not need charge from the charger 810, i.e., the controller 804 is operating in a fully charged mode. Of course, other modes are suitable for use as well, and the system 800 is capable of supporting a different number of modes (e.g., two modes, three modes, five modes, etc.). Further, the example correspondence between pattern and status indication is provided by way of example and not by way of limitation. Thus, it will be appreciated that illustrated patterns may indicate alternative statuses and/or illustrated statuses may be represented by alternative patterns. Further details will now be provided with reference to FIG. 14.

Figure 14:
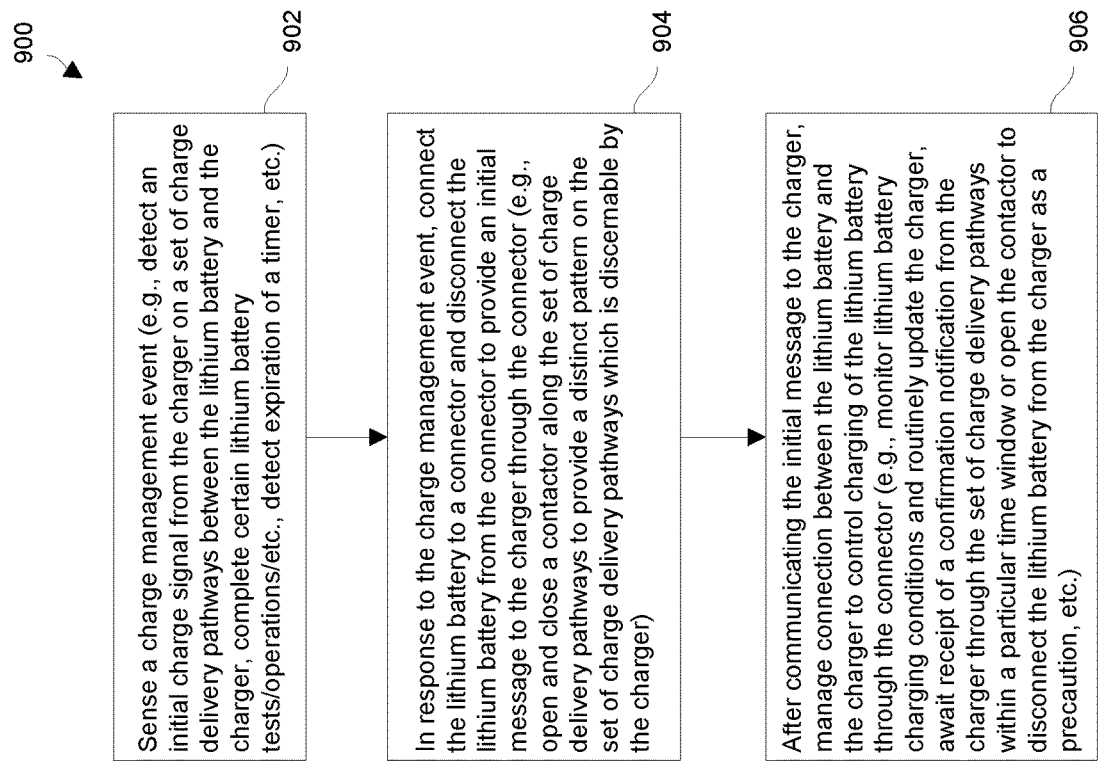
FIG. 14 is a flowchart of a procedure which is performed by a rechargeable battery powered apparatus of a charging system in accordance with some example embodiments.

FIG. 14 shows a procedure 900 which is performed by a rechargeable battery powered apparatus of a charging system in accordance with some example embodiments. Such operation involves communication between the apparatus and a charger across a set of charge delivery pathways (e.g., also see FIG. 11).

At 902, the apparatus senses a charge management event. Examples of suitable charge management events include detection of an initial charge signal from the charger on the set of charge delivery pathways, completion of certain rechargeable battery tests or operations, expiration of a timer, and so on.

At 904, the apparatus, in response to the charge management event, connects the rechargeable battery to the connector and disconnect the rechargeable battery from the connector to provide an initial message to the charger through the connector. In some arrangements, the apparatus opens and closes a contactor along the set of charge delivery pathways between the rechargeable battery and the charger to provide a distinct pattern which is discernable by the charger (also see the patterns in FIGS. 12 and 13).

At 906, the apparatus, after communicating the initial message to the charger, manages connection between the rechargeable battery and the charger to control charging of the rechargeable battery through the connector. In some arrangements, the apparatus routinely or continuously monitors charging conditions and communicates with the charger via messages and notifications. In some arrangements, the apparatus awaits receipt of a confirmation notification from the charger through the set of charge delivery pathways within a particular time window or opens the contactor to disconnect the rechargeable battery from the charger as a precaution.

Figure 15:
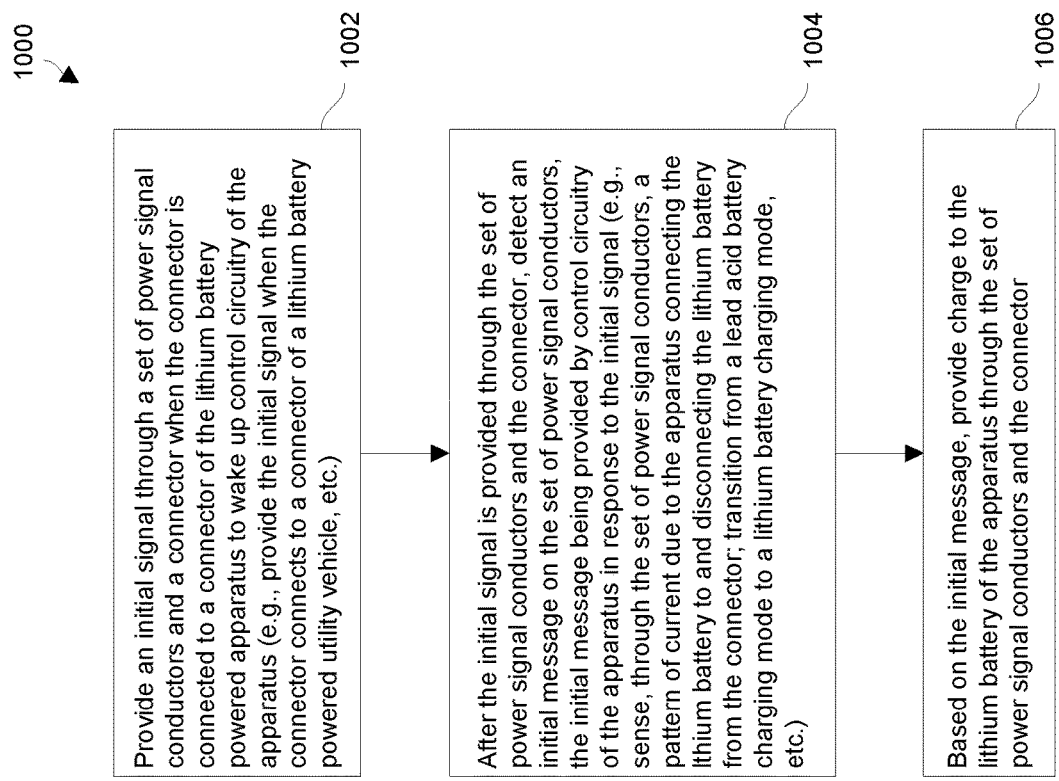
FIG. 15 is a flowchart of a procedure which is performed by a charger of a charging system in accordance with some example embodiments.

FIG. 15 shows a procedure 1000 which is performed by a charger of a charging system in accordance with some example embodiments. Such operation involves communication between a rechargeable battery powered apparatus and the charger across a set of power signal conductors (e.g., also see the charge delivery pathways 840 in FIG. 11).

At 1002, the charger provides an initial signal through the set of power signal conductors and a connector when the connector is connected to the connector of a rechargeable battery powered apparatus to wake up control circuitry of the apparatus (e.g., a utility vehicle).

At 1004, the charger, after the initial signal is provided through the set of power signal conductors and the vehicle connector, detects an initial message on the set of power signal conductors. The initial message is provided by the control circuitry of the rechargeable battery powered apparatus in response to the initial signal. Along these lines, the apparatus may connect the rechargeable battery to and disconnect the rechargeable battery from the set of power signal conductors to generate the message (also see the patterns in FIGS. 12 and 13). In some arrangements, the charger operates in a lead acid battery charging mode until it receives the message and then transitions to a lithium battery charging mode.

At 1006, the charger, based on the initial message, provides charge to the rechargeable battery of the apparatus through the set of power signal conductors and the connector. Along these lines, the charger is able to provide an appropriate charge rate (e.g., a normal charge rate, a partial charge rate, etc.).

As described above, improved techniques are directed to charging a rechargeable battery 802 based on communication that occurs between a rechargeable battery controller 804 and a charger 810 over a set of charge delivery pathways 840 (FIG. 11). In particular, control logic 832 opens and closes a contactor 830 that controls the set of charge delivery pathways 840 to send a message 850 to the charger 810 indicating a particular charge mode 810. The charger 810 may respond over the set of charge delivery pathways 840 confirming correct receipt of the message 850 and then appropriately provide charge to the rechargeable battery 802 through the set of charge delivery pathways 840 in accordance with the particular charge mode. At any time, the control logic 832 may operate the contactor 830 to further communicate with the charger 810 and/or disconnect the rechargeable battery 802 from the charger 810. Such a technique may thus provide a mechanism for the controller 804 to inform the charger 810 of various items of information (e.g., whether the battery is lithium or lead acid, a particular charging mode, a change in charging mode, and so on).

While various embodiments of the present disclosure have been particularly shown and described, it will be understood by those skilled in the art that various changes in form and details may be made therein without departing from the spirit and scope of the present disclosure as defined by the appended claims.

One should appreciate that the current state of the art for charging electric vehicles utilizes either an on-board or shelf charger to provide the power for charging the battery system. In the case where the battery system is comprised of rechargeable ion cells, a battery management system (BMS) may also be employed. In more advanced systems, communications between the BMS and a battery charger enables the BMS to control the battery charger profile or cycle to ensure safe and reliable rechargeable ion cell performance over time. The communications between BMS and charger may, for example, be provided via a two-wire CANBus or similar communications protocol. This type of protocol requires signal connection between BMS and battery charger. In the case of an off-board or shelf charger, these additional signal connections will need to be made along with the power and lockout connections. This drives complexity and cost into the connector design. In addition to connector complexity, circuitry must also be employed in the BMS and charger to enable the communications protocol.

However, with the improved techniques disclosed herein, a charging system may involve interval based communications between the rechargeable battery powered apparatus and the charger. In the field of battery charging system and particularly electric vehicles, such techniques may be applied to smartly control charging (e.g., charging of an electric vehicle equipped with a battery management system).

In some embodiments, the charger, BMS, and interconnections are simplified by utilizing existing components inherent in both devices to provide a rudimentary, yet effective method for communications between BMS and charger. This simplified method specifically utilizes the contactor controlled by the BMS and the existing power connection strategy between both devices. The communications protocol may be based on multiples of a discrete, predefined time interval. Each multiple of this time interval corresponds to a specific mode of operation, e.g., normal charge, pre-charge, storage charge, etc.

Figure 16A:
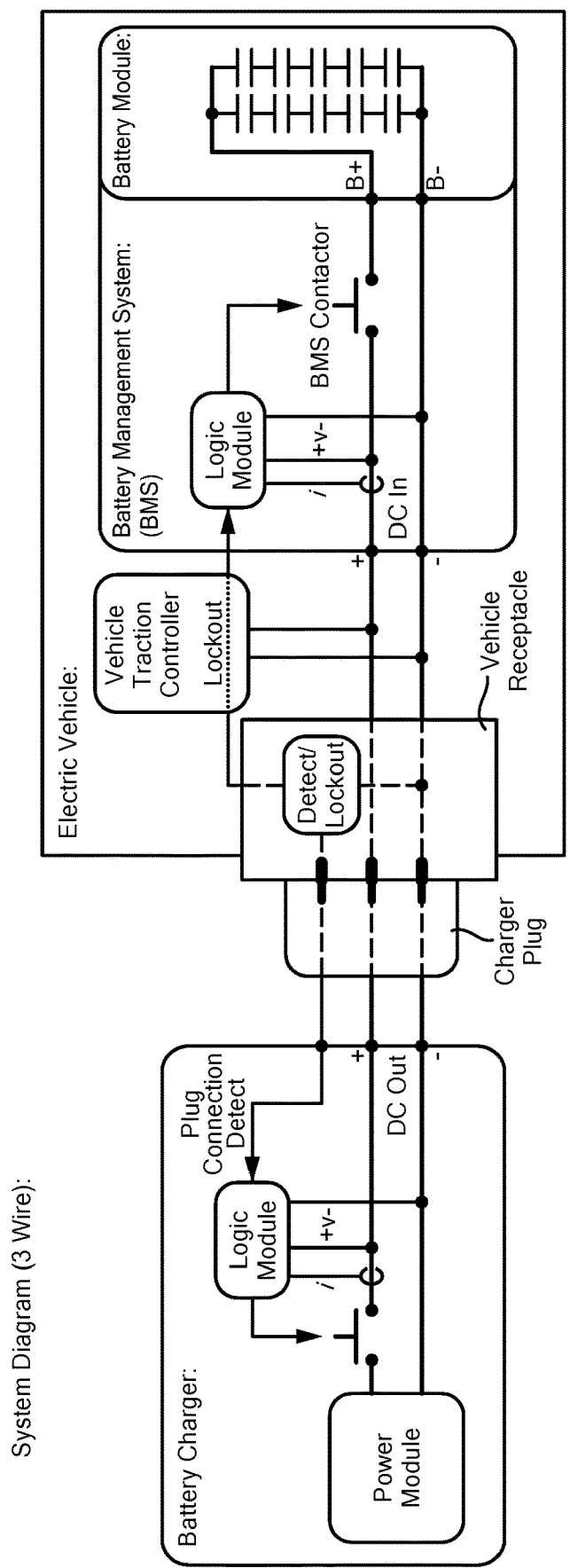
FIG. 16A a system diagram illustrating a system in accordance with some example embodiments.
Figure 16B:
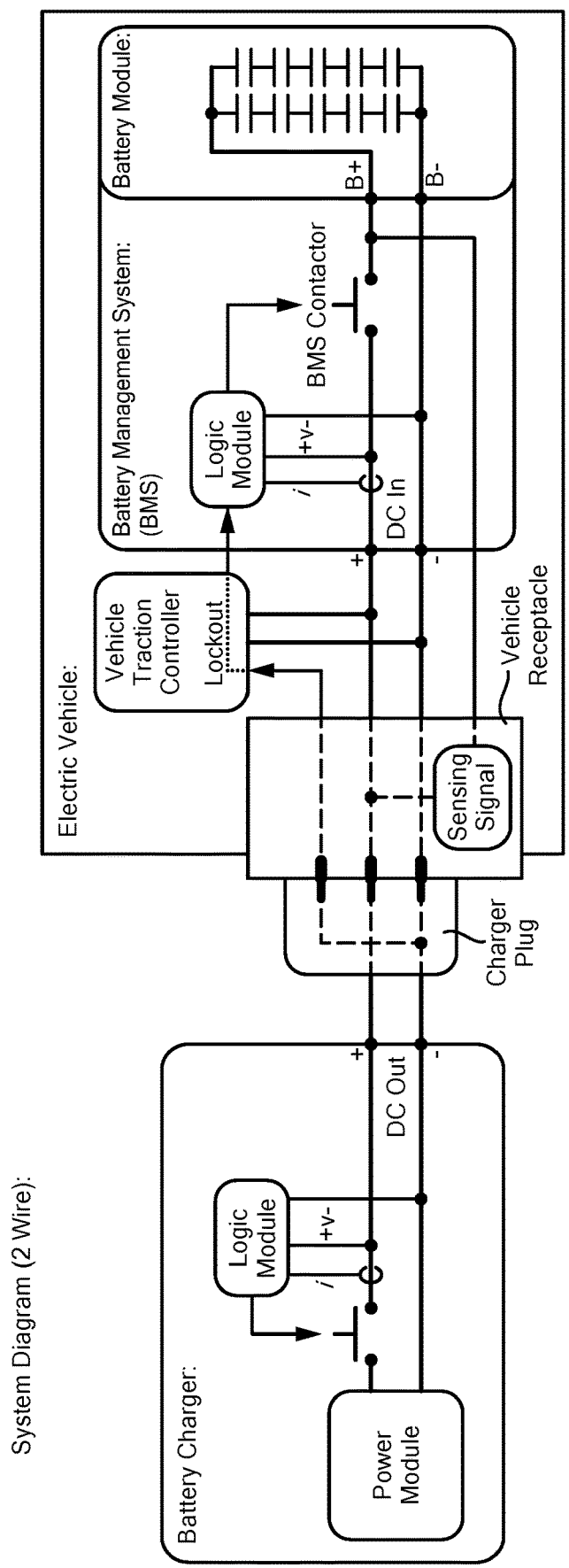
FIG. 16B is another system diagram illustrating another system in accordance with some example embodiments.

FIGS. 16A and 16B show, in accordance with certain embodiments, system diagrams for improved BMS controlled contactors. FIG. 16A shows a 3-wire system diagram. FIG. 16B shows a 2-wire system diagram.

With reference to FIGS. 16A and 16B, a primary function of the BMS contactor is to isolate the battery module cells from the vehicle electrical system (and charging system) in the event the BMS detects a condition that would be sub-optimal for the rechargeable ion cells. The state of the BMS controlled contactor is detectable by the charger through either voltage or current sensing or both as part of the normal charging function. This system capitalizes on the charger's ability to sense the BMS contactor state and the BMS's ability to control the BMS contactor state. By programming the BMS to close the BMS contactor for a total time period comprised of a multiple of a predefined time intervals, this enables a charger (with comparable programming), to derive a specific mode of operation from this time period. By decoding the number of time intervals in the total time of BMS contact closure, the charger can determine a specific mode of operation or profile being requested by the BMS.

Figure 17:
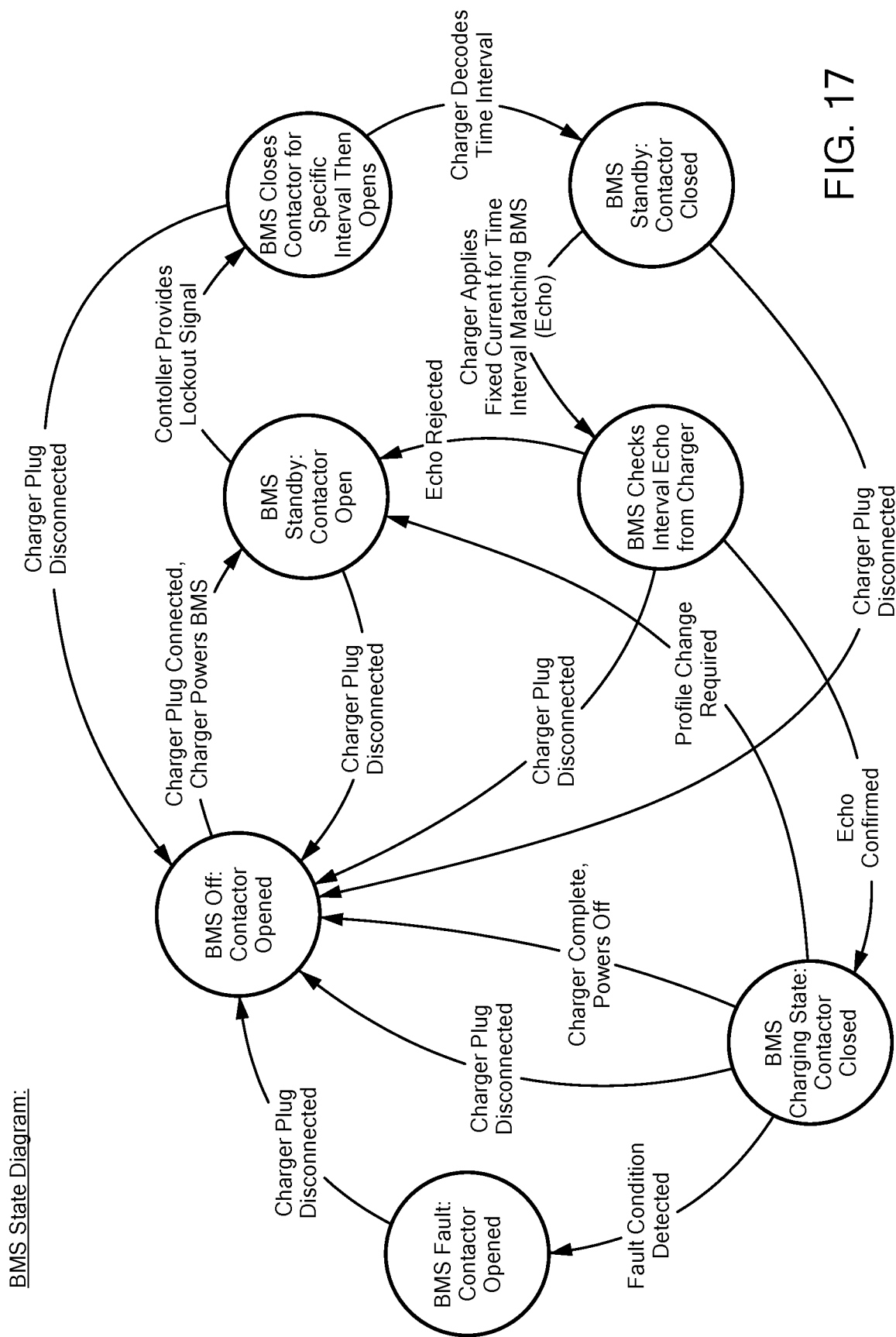
FIG. 17 a state diagram for a battery management system in accordance with some example embodiments.
Figure 18:
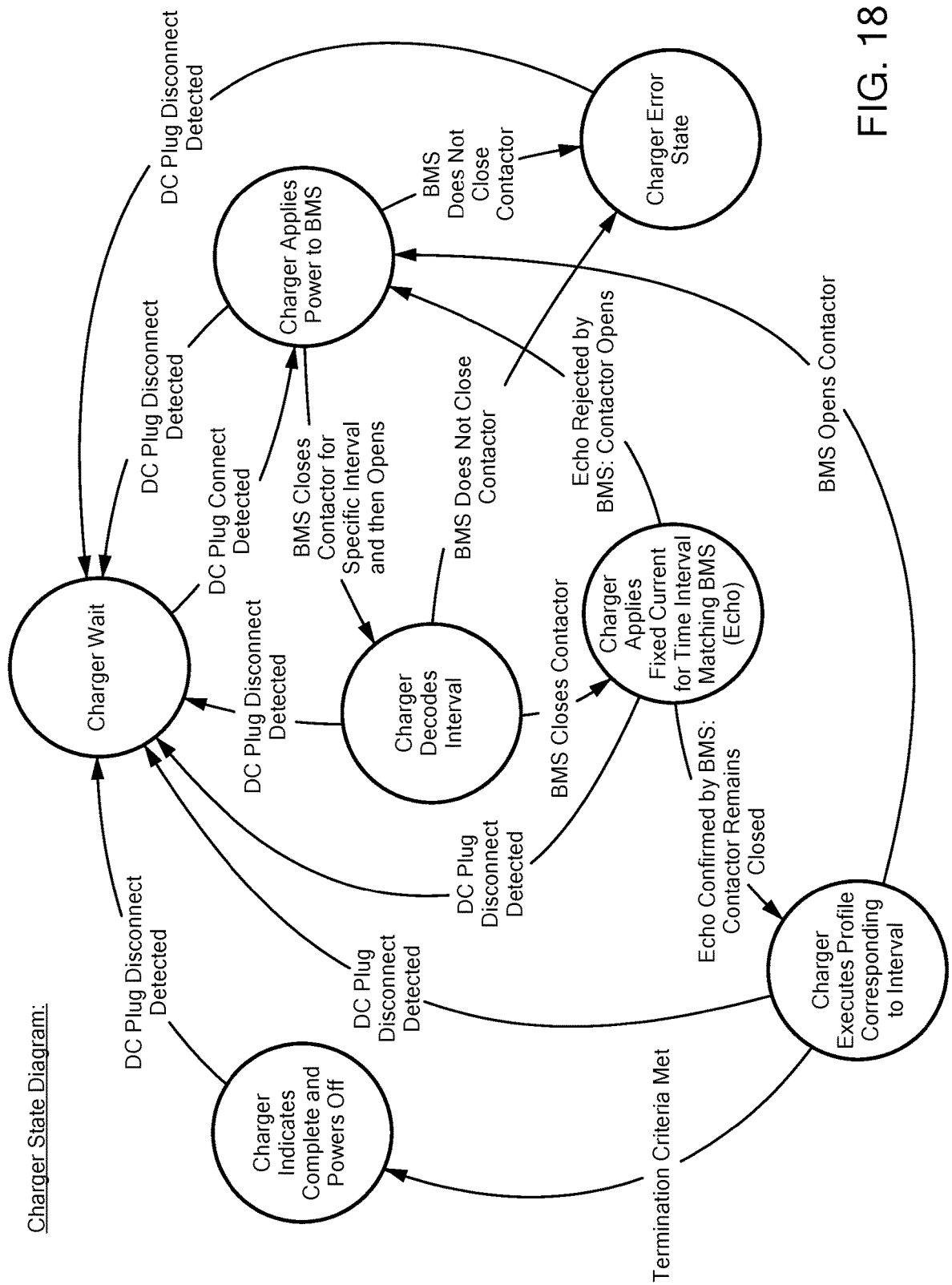
FIG. 18 a state diagram for a charger in accordance with some example embodiments.

FIG. 17 shows, in accordance with certain embodiments, a BMS state diagram that captures the functional sequencing of the communications from the Battery Management System perspective. FIG. 18 shows, in accordance with certain embodiments, a charger state diagram that captures the functional sequencing of the communications from the charger perspective.

As shown in the diagrams of FIGS. 17 and 18 as well as in FIG. 12, a communications protocol can be established through the use of the contactor. By utilizing the contactor controlled by the BMS, the contactor can be made to close for specific multiples of a predefined time interval. Each unique multiple represents a different profile or cycle to be requested by the BMS and executed by the charger (e.g., see FIG. 12).

Alternatively, the time based intervals do not need to be contiguous (e.g., see FIG. 13). In this method, each specific count of time intervals corresponds to a different charge profile. Further shown in the charger and BMS state diagrams are the methods possible for Error Conditions, Hand Shaking, and Charge Profile Changes while Charging is underway.

Error Conditions: BMS "opens" or "does not close" contactor

Hand Shaking: Charger "Echoes" back the time or count of BMS contactor closure via a set charge current Profile Change: BMS "opens" contactor during current charge cycle and provides new profile via a new time interval multiple or count In some embodiments, the time interval can be selected as any interval sufficient in length to accommodate detection time and time to engage/disengage contactor (e.g., see FIGS. 12 and 13).

In some embodiments, encoding messages is based on the number of consecutive time intervals the contactor closed versus encoding based on set of open/close interval values. Along these lines, various combinations of opening and closing can be used to signal values. For instance, for a designated series, four time intervals may have up to 16 different message values depending on sequence of open and closed periods (e.g., binary 0000, 0001, 0010, . . . 0111, 1111). In the approach that conveying messages based on number of consecutive time intervals (FIG. 12), contactor operation creates less noise than repeatedly opening/closing the contactor. Additionally, there is less the wear on the contactor. On the other hand, opening/closing the contactor (FIG. 13) may provide advantages (e.g., easy to count rising/falling edges, etc.), and so on.

In some embodiments, the charger has an option to auto-select between lead acid and lithium charger modes. Such operation may be performed at startup.

In some embodiments, the techniques are applied to tools using Li-ion batteries, such as power tools. Such modifications and enhancements are intended to belong to various embodiments of the disclosure.

What is claimed is:

1. A system for controlling charging of a rechargeable battery, the system comprising:
   a rechargeable battery configured to provide rechargeable battery power to a set of electrical loads;
   a connector configured to connect to a charger; and
   control circuitry coupled with the rechargeable battery and the connector, the control circuitry being operative to:
   sense a charge management event,
   in response to the charge management event, connect the rechargeable battery to the connector and disconnect the rechargeable battery from the connector to provide an initial message to the charger through the connector, and
   after communicating the initial message to the charger, manage connection between the rechargeable battery and the charger to control charging of the rechargeable battery through the connector;
   wherein the control circuitry includes:
   a contactor coupled with the rechargeable battery and the connector, and
   control logic coupled with the contactor;
   wherein, when the control circuitry connects the rechargeable battery to the connector and disconnects the rechargeable battery from the connector to provide an initial message to the charger in response to the charge management event, the control logic is operative to control opening and closing of the contactor; and
   wherein, when the control circuitry manages connection between the rechargeable battery and the charger to control charging of the rechargeable battery, the control logic is operative to continue to control opening and closing of the contactor to send further messages to the charger through the connector.

2. A system as in claim 1 wherein the control logic, when controlling opening and closing of the contactor, is operative to:
   perform a set of rechargeable battery evaluation operations to assess a current condition of the rechargeable battery,
   based on a result of the set of rechargeable battery evaluation operations, select a particular charge mode from multiple selectable charge modes, and
   actuate the contactor in a predefined manner to identify the particular charge mode to the charger.

3. A system as in claim 2 wherein the rechargeable battery includes a set of lithium-ion cells; and
   wherein the multiple selectable charge modes include:
   a normal charge rate mode identified by a first contactor open/close pattern, the normal charge rate mode involving charging of the rechargeable battery at a normal charge rate,
   a partial charge rate mode identified by a second contactor open/close pattern, the partial charge rate mode involving charging of the rechargeable battery at a partial charge rate which is less than the normal charge rate,
   a discharge mode identified by a third contactor open/close pattern, the discharge mode involving discharging of the rechargeable battery, and
   a no-adjustment mode identified by a fourth contactor open/close pattern, the no-adjustment mode involving no charging or discharging of the rechargeable battery; and wherein the first, second, third, and fourth contactor open/close patterns are different from each other.

4. A system as in claim 3 wherein the control logic, when selecting the particular charge mode from multiple selectable charge modes, is operative to:
select one of the first, second, third, and fourth contactor open/close patterns based on the result of the set of rechargeable battery evaluation operations; and
wherein each of the first, second, third, and fourth contactor open/close patterns includes a different time interval in which the control logic maintains closure of the contactor.

5. A system as in claim 3 wherein the control logic, when selecting the particular charge mode, is operative to:
select one of the first, second, third, and fourth contactor open/close patterns based on the result of the set of rechargeable battery evaluation operations; and
wherein each of the first, second, third, and fourth contactor open/close patterns includes a different number of times in which the control logic opens and closes the contactor.

6. A system as in claim 3 wherein each of the first, second, third, and fourth contactor open/close patterns includes the control logic holding the contactor closed for at least one second and for less than 30 seconds before opening the contactor.

7. A system as in claim 3 wherein, when the contactor is closed, the contactor connects (i) a first conductive pathway between the rechargeable battery and the charger and (ii) a second conductive pathway between the rechargeable battery and the charger, the first and second conductive pathways forming a set of charge delivery pathways to deliver charge from the charger to the rechargeable battery through the connector; and
wherein, when the contactor is open, the contactor disconnects at least one of the first and second conductive pathways to prevent charge delivery from the charger to the rechargeable battery through the connector.

8. A system as in claim 7 wherein the control logic is further operative to:
after the control logic provides the initial message and before the control logic manages connection between the rechargeable battery and the charger, sense the set of charge delivery pathways for a charger notification from the charger and through the connector in response to the initial message.

9. A system as in claim 7 wherein the control logic, when sensing the set of charge delivery pathways for the charger notification, is operative to:
listen for a predefined signal from the charger indicating whether the charger has correctly received the initial message.

10. A system as in claim 9 wherein the control logic, when listening for the predefined signal from the charger, is operative to:
obtain, on the set of charge delivery pathways, a charger response from the charger, and
compare the charger response to an expected response to determine whether the charger is ready to properly charge the rechargeable battery.

11. A system as in claim 7 wherein the charger is operative to provide a charging voltage on the set of charge delivery pathways; and
wherein, while the charger provides the charging voltage on the set of charge delivery pathways, the control logic is operative to listen for a predefined signal from the charger indicating whether the charger has correctly received the initial message, the predefined signal being different from the charging voltage.

12. A system as in claim 7 wherein the charger is operative to provide a charging voltage on the set of charge delivery pathways; and
wherein, while the charger provides the charging voltage on the set of charge delivery pathways, the control logic is operative to open and close the contactor to communicate the initial message to the charger.

13. A system as in claim 7 wherein the control logic is further operative to:
sense a second event, and
in response to the second event, connect the rechargeable battery to the connector and disconnect the rechargeable battery from the connector to provide a follow-up message to the charger on the set of charge delivery pathways.

14. A system as in claim 13 wherein the control logic is further operative to:
after providing the follow-up message to the charger on the set of charge delivery pathways, sense for a follow-up notification on the set of charge delivery pathways from the charger and through the connector in response to the follow-up message.

15. A system as in claim 13 wherein the control circuitry, when sensing the charge management event, is operative to:
detect, as the charge management event, connection of the charger to the connector; and
wherein the control logic, when sensing the second event, is operative to:
detect, as the second event, expiration of a timer that measures a predefined amount of rechargeable battery charging time.

16. A utility vehicle, comprising:
a utility vehicle body;
a set of electrical loads supported by the utility vehicle body; and
a charge control system supported by the utility vehicle body and coupled with the set of electrical loads, the charge control system including:
a rechargeable battery configured to provide rechargeable battery power to the set of electrical loads of a utility vehicle,
a connector supported by the utility vehicle body, the connector being configured to connect to a charger, and
control circuitry coupled with the rechargeable battery and the connector, the control circuitry being operative to:
sense a charge management event,
in response to the charge management event, connect the rechargeable battery to the connector and disconnect the rechargeable battery from the connector to provide an initial message to the charger, and
after communicating the initial message to the charger, manage connection between the rechargeable battery and the charger to control charging of the rechargeable battery;
wherein the control circuitry of the charge control system includes:
a contactor coupled with the rechargeable battery and the connector, and
control logic coupled with the contactor;
wherein, when the control circuitry connects the rechargeable battery to the connector and disconnects the rechargeable battery from the connector to provide an initial message to the charger in response to the charge management event, the control logic is operative to control opening and closing of the contactor; and wherein, when the control circuitry manages connection between the rechargeable battery and the charger to control charging of the rechargeable battery, the control logic is operative to continue to control opening and closing of the contactor to send further messages to the charger through the connector.

17. A utility vehicle as in claim 16 wherein the control logic, when controlling opening and closing of the contactor, is operative to:

perform a set of rechargeable battery evaluation operations to assess a current condition of the rechargeable battery, based on a result of the set of rechargeable battery evaluation operations, select a particular charge mode from multiple selectable charge modes, and actuate the contactor in a predefined manner to identify the particular charge mode to the charger.

18. In a utility vehicle, a method of controlling charging of a rechargeable battery of a utility vehicle, the method comprising:

sensing a charge management event, in response to the charge management event, connecting the rechargeable battery to a connector of the utility vehicle and disconnecting the rechargeable battery from the connector of the utility vehicle to provide an initial message to the charger through the connector, and after communicating the initial message to the charger, managing connection between the rechargeable battery and the charger to control charging of the rechargeable battery through the connector;

wherein connecting the rechargeable battery to the connector and disconnecting the rechargeable battery from the connector provides an initial message to the charger in response to the charge management event; and wherein managing the connection between the rechargeable battery and the charger to control charging of the rechargeable battery includes controlling opening and closing of a contactor coupled with the rechargeable battery and the connector to send further messages to the charger through the connector.

19. A charger that charges a rechargeable battery of a utility vehicle, the charger comprising:

a vehicle connector operative to connect to a connector of the utility vehicle;

a set of power signal conductors coupled to the vehicle connector; and a control circuit coupled with the set of power signal conductors, the control circuit being operative to:

provide an initial signal through the set of power signal conductors and the vehicle connector when the vehicle connector is connected to the connector of the utility vehicle to wake up control circuitry of the utility vehicle;

after the initial signal is provided through the set of power signal conductors and the vehicle connector, detect an initial message on the set of power signal conductors, the initial message being provided by the control circuitry of the utility vehicle in response to the initial signal; and based on the initial message, provide charge to the rechargeable battery of the utility vehicle through the set of power signal conductors and the vehicle connector;

wherein detecting the initial message includes receiving the initial message in response to control circuitry of the utility vehicle connecting the rechargeable battery to the connector of the utility vehicle and disconnecting the rechargeable battery from the connector of the utility vehicle; and wherein the control circuit is further operative to receive further messages in response to the control circuitry of the utility vehicle continuing to control opening and closing of a contactor coupled with the rechargeable battery and the connector of the utility vehicle.

20. A charger as in claim 19 wherein the control circuit, when detecting the initial message on the set of power signal conductors, is operative to:

sense a pattern of current through the set of power signal conductors, the pattern of current resulting from circuitry of the utility vehicle connecting the rechargeable battery to the connector of the utility vehicle and disconnecting the rechargeable battery from the connector of the utility vehicle.

21. A charger as in claim 19 wherein the control circuit is further operative to:

in response to the initial message, switch from a lead acid battery charging mode to a lithium battery charging mode.

* * * * *